United States Patent
Judge et al.

(10) Patent No.: US 8,413,716 B2
(45) Date of Patent: Apr. 9, 2013

(54) POSITION DATA BASED METHOD, INTERFACE AND DEVICE FOR BLOWOUT PREVENTER

(75) Inventors: Robert Arnold Judge, Houston, TX (US); Eric L. Milne, Pearland, TX (US)

(73) Assignee: Hydril USA Manufacturing LLC, Houston, TX (US)

( * ) Notice: Subject to any disclaimer, the term of this patent is extended or adjusted under 35 U.S.C. 154(b) by 785 days.

(21) Appl. No.: 12/567,998

(22) Filed: Sep. 28, 2009

(65) Prior Publication Data

US 2010/0152901 A1 Jun. 17, 2010

Related U.S. Application Data

(60) Provisional application No. 61/138,005, filed on Dec. 16, 2008.

(51) Int. Cl.
*E21B 33/06* (2006.01)

(52) U.S. Cl.
USPC ........... 166/75.11; 166/65.1; 166/66; 251/1.3

(58) Field of Classification Search ............... 166/255.1, 166/66, 53, 65.1, 75.11; 251/1.3
See application file for complete search history.

(56) References Cited

U.S. PATENT DOCUMENTS

| | | |
|---|---|---|
| 5,320,325 A | 6/1994 | Young et al. |
| 5,407,172 A | 4/1995 | Young et al. |
| 2008/0196888 A1 | 8/2008 | Judge et al. |
| 2008/0197306 A1 | 8/2008 | Judge |

*Primary Examiner* — Brad Harcourt
(74) *Attorney, Agent, or Firm* — Bracewell & Giuliani LLP

(57) ABSTRACT

Methods and devices for using position data of a piston connected to a ram block in a blowout preventer to determine a backlash of the ram block, and/or to record a position of the ram block, and/or to calculate an instant when a supplemental closing pressure is desired to be applied, and/or to determine when maintenance of a ram locking mechanism is due, and/or to determine when sealing elements are worn.

29 Claims, 22 Drawing Sheets

POSITION DATA BASED METHOD, INTERFACE AND DEVICE FOR BLOWOUT PREVENTER

RELATED APPLICATIONS

This application is related to, and claims priority from, U.S. Provisional Patent Application Ser. No. 61/138,005 filed on Dec. 16, 2008, entitled "Position Data Based Method, Interface and Device for Blowout Preventer", the disclosure of which is incorporated here by reference.

BACKGROUND

1. Technical Field

Embodiments of the subject matter disclosed herein generally relate to methods, interfaces and devices and, more particularly, to mechanisms and techniques for using received position data of a piston to determine and/or display various quantities of interest.

2. Discussion of the Background

A blowout preventer (BOP) is a safety mechanism that is used at a wellhead of an oil or gas well. The BOP may be used for offshore drilling and also for land-based drilling. The BOP is configured to shut the flow from the well when a certain event occurs. One such event may be the uncontrolled flow of gas, oil or other well fluids from an underground formation into the well. Such event is sometimes referred to as a "kick" or a "blowout" and may occur when formation pressure exceeds the pressure applied to it by the column of drilling fluid. This event is unforeseeable and if no measures are taken to control it, the well and/or the associated equipment may be damaged.

Another event that may damage the well and/or the associated equipment is a hurricane or an earthquake. Both of these natural phenomena may damage the integrity of the well and the associated equipment. For example, due to the high winds produced by a hurricane at the surface of the sea, the vessel or the rig that powers the undersea equipment may start to drift requiring the disconnection of the power/communication cords or other elements that connect the well to the vessel or rig. Other events that may damage the integrity of the well and/or associated equipment are possible as would be appreciated by those skilled in the art.

Thus, the BOP may be installed on top of the wellhead to seal it in case that one of the above events is threatening the integrity of the well. The BOP is conventionally implemented as a valve to prevent and/or control the release of pressure either in the annular space between the casing and the drill pipe or in the open hole (i.e., hole with no drill pipe) during drilling or completion operations.

FIG. 1 shows a well 10 that is drilled undersea. A wellhead 12 of the well 10 is fixed to the seabed 14. The BOP 16 is secured to the wellhead 12. The BOP may be an annular BOP or a ram block BOP or a combination thereof. The annular BOP may include an annular elastomer "packers" that may be activated (e.g., inflated) to encapsulate drill pipe and well tools and seal the wellbore. Ram-type BOPs typically include a body and at least two oppositely disposed bonnets. The bonnets partially house a pair of ram blocks. The ram blocks may be closed or opened under pressurized hydraulic fluid to seal the well.

FIG. 1 shows, for clarity, the ram BOP 16 detached from the wellhead 12. However, the BOP 16 is attached to the wellhead 12 or other part of the well. A pipe (or tool) 18 is shown traversing the BOP 16 and entering the well 10. The BOP 16 may have two ram blocks 20 attached to corresponding pistons 22. The pistons 22 move integrally with the ram blocks 20 along directions A and B to close the well 10. Positions C and D of the pistons 22 may be detected as disclosed, for example, in Young et al., Position Instrumented Blowout Preventer, U.S. Pat. No. 5,320,325 (herein Young 1), Young et al., Position Instrumented Blowout Preventer, U.S. Pat. No. 5,407,172 (herein Young 2), and Judge et al., RAM BOP Position Sensor, U.S. Patent Application Publication No. 2008/0196888, the entire contents of which are incorporated here by reference.

These documents disclose a magnetostrictive device for determining the position of the piston 22 relative to the body of the BOP 16. These devices generate a magnetic field that moves with the piston and disturbs another magnetic field generated by a wire enclosed by a tube. When this disturbance takes place, a magnetic disturbance propagates as an acoustic wave via the tube to a detector. The time necessary by the magnetic disturbance to propagate to the detector may be measured and used to determine the position of the piston 22 relative to the body of the BOP 16.

Other techniques for measuring the position of the piston are known, for example, the use of a linear variable differential transformer (LVDT). LVDT is a type of electrical transformer used for measuring linear displacement. The transformer may have three solenoidal coils placed end-to-end around a tube. The centre coil is the primary, and the two outer coils are the secondaries. A cylindrical ferromagnetic core, attached to the object whose position is to be measured, slides along the axis of the tube. An alternating current is driven through the primary, causing a voltage to be induced in each secondary proportional to its mutual inductance with the primary.

As the core moves, these mutual inductances change, causing the voltages induced in the secondaries to change. The coils are connected in reverse series, so that the output voltage is the difference (hence "differential") between the two secondary voltages. When the core is in its central position, equidistant between the two secondaries, equal but opposite voltages are induced in these two coils, so the output voltage is zero.

When the core is displaced in one direction, the voltage in one coil increases as the other decreases, causing the output voltage to increase from zero to a maximum. This voltage is in phase with the primary voltage. When the core moves in the other direction, the output voltage also increases from zero to a maximum, but its phase is opposite to that of the primary. The magnitude of the output voltage is proportional to the distance moved by the core (up to its limit of travel), which is why the device is described as "linear." The phase of the voltage indicates the direction of the displacement.

Because the sliding core does not touch the inside of the tube, it can move without friction, making the LVDT a highly reliable device. The absence of any sliding or rotating contacts allows the LVDT to be completely sealed from its environment. LVDTs are commonly used for position feedback in servomechanisms, and for automated measurement in machine tools and many other industrial and scientific applications.

Based on the position of the piston relative to the body of the BOP, various quantities of interest may be derived. For example, Young 1 discloses at column 5, lines 41-49, similar to Judge et al. in paragraph [0038] that "[w]ith the knowledge of the absolute position of the ram, it can be determined if the ram is completely closed, if the ram is hung up, to what degree the packer or wear pad of the front of the ram is worn, and to what degree there is a backlash or wear in the piston mechanism." However, neither Young 1 nor Young 2 discloses how to determine, evaluate or display these quantities and Judge et al. suggests plotting a closing pressure of the ram blocks versus their positions for obtaining information about the ram blocks.

Traditionally, well control operators rely on flow readings of fluid flow through the ram BOP in order to determine ram functionality. For example, a well control operator may fully open a ram BOP, measure the fluid flow through the ram BOP, and compare the measured fluid flow to an expected fluid flow. The well control operator may also fully close a ram BOP and measure whether any fluid flows through the ram BOP. Based on these readings, the positions of the rams in between the open and closed positions may be extrapolated. However, these techniques introduce a certain amount of uncertainty because the expected flow of fluid through the ram BOP may not be accurate. For example, the composition of the fluids flowing through the BOP may change such that measurements taken may be misleading.

Accordingly, it would be desirable to provide systems and methods that effectively determine and/or display the quantities of interest.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of BOP systems. However, the embodiments to be discussed next are not limited to these systems, but may be applied to other systems that have a moving piston whose position may be determined.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
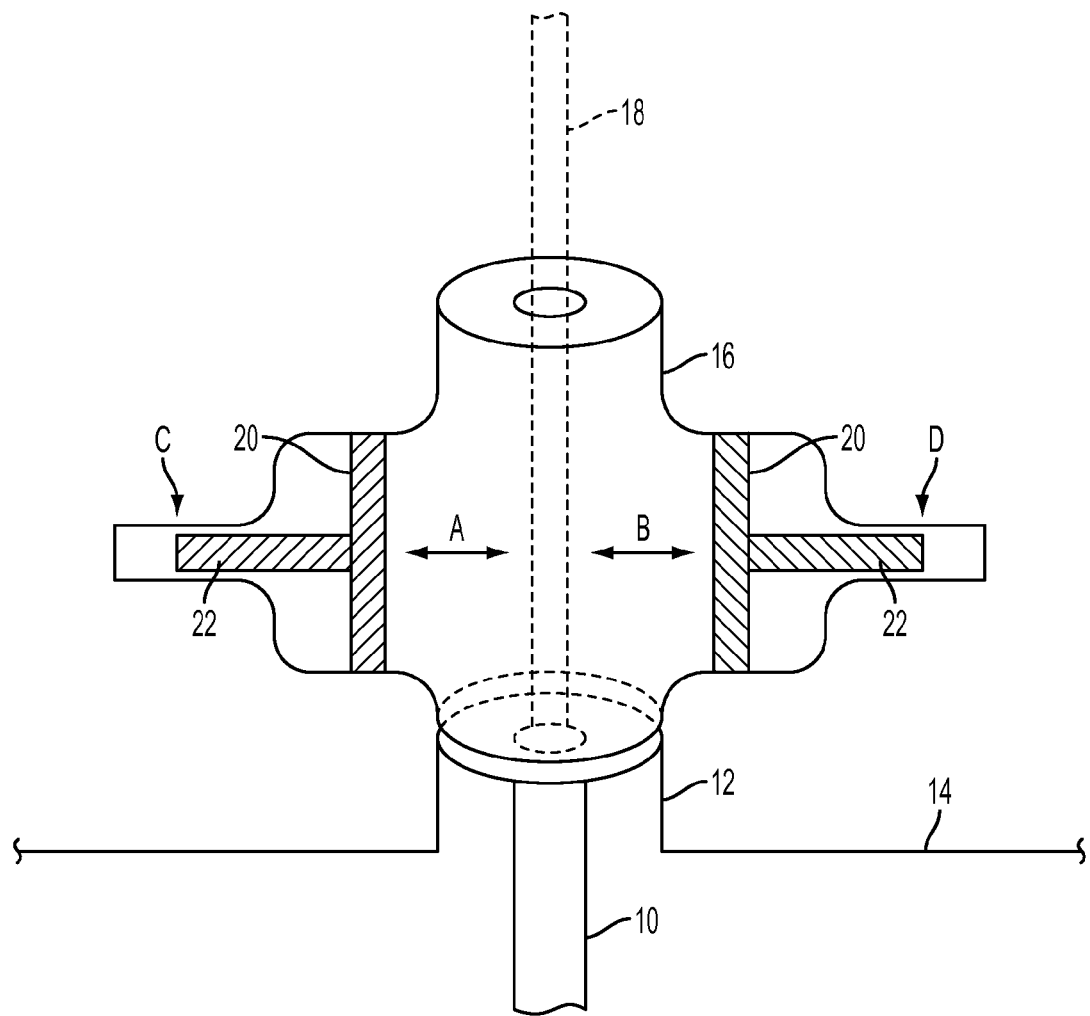
FIG. 1 is a schematic diagram of a conventional ram BOP.
Figure 2:
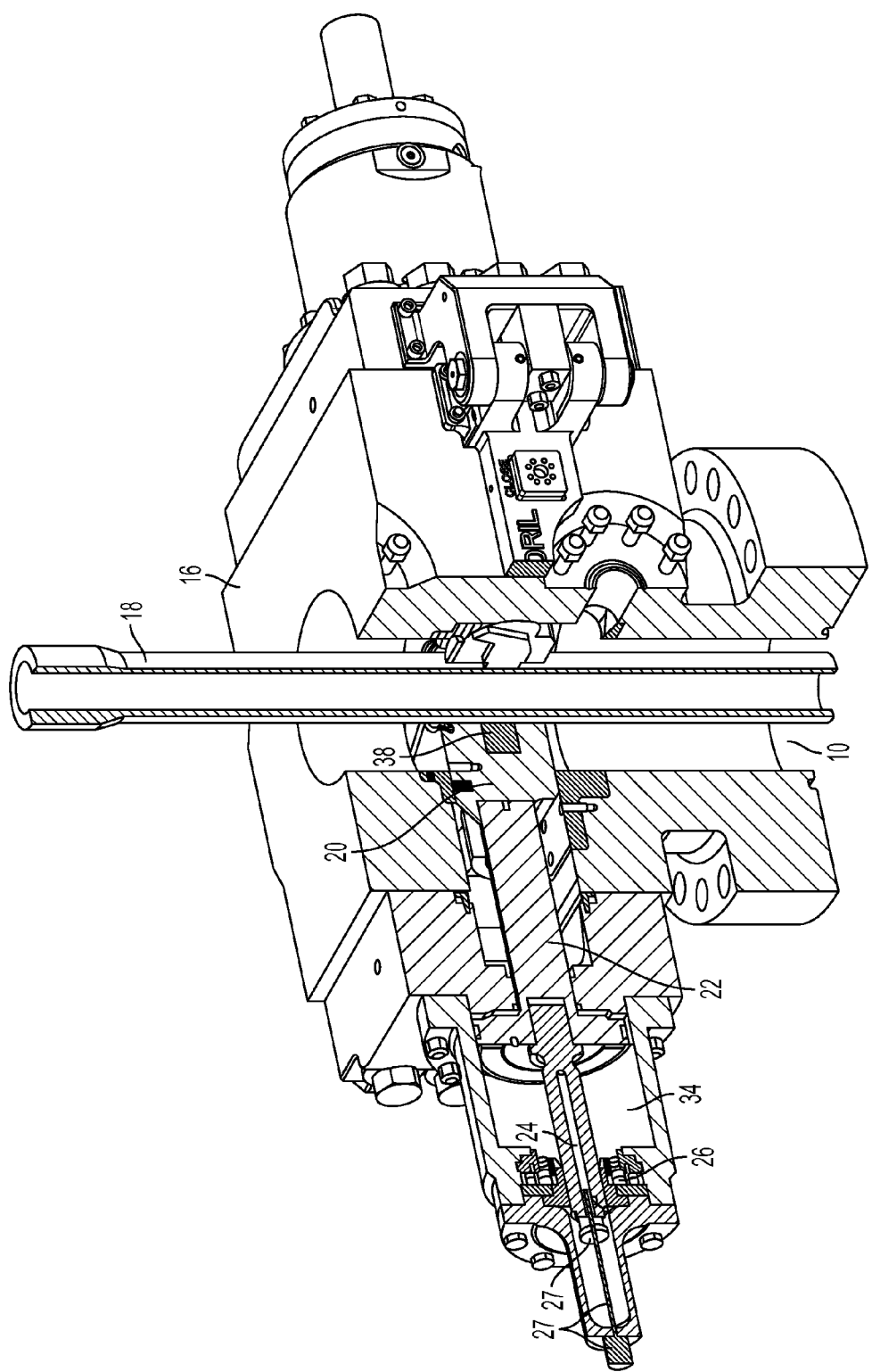
FIG. 2 is a schematic diagram of a ram BOP that includes a position sensing mechanism.

As shown in FIG. 2, the BOP 16 may include, besides the ram block 20 and the piston 22, an extension piston 24 that may be locked by a ram locking mechanism 26. Also, the BOP 16 may include a position sensing mechanism 27. According to an exemplary embodiment, the position of the piston 22 may be used for determining when an elastomer 38 that is displaced in the ram block 20, as shown in FIG. 2, has to be changed. The elastomer 38 is attached to the front side of the ram block 20 such that when the ram block 20 is closed and presses against the pipe 18, it ensures a substantial leakage free contact between the ram block 20 and the pipe 18, i.e., no liquid from below the ram block 20 escapes in the space above the ram block 20. However, after a certain number of cycles involving closing and opening the ram block 20, the elastomer 38 wears off and needs to be replaced. Later exemplary embodiments disclose novel methods and mechanisms for determining when the elastomer needs to be changed given the fact that the operator of the rig cannot visually inspect the ram blocks and the elastomer as these components are under sea or underground.

While the arrangement shown in FIG. 2 (i.e., the ram locking mechanism 26) locks by default the extension piston 24, the piston 22 and the ram block 20, other embodiments may have these elements locked only when instructed by an operator of the rig. A part of the ram locking mechanism 26, which locks the extension piston 24 is shown in more details in FIG. 3.

Figure 3:
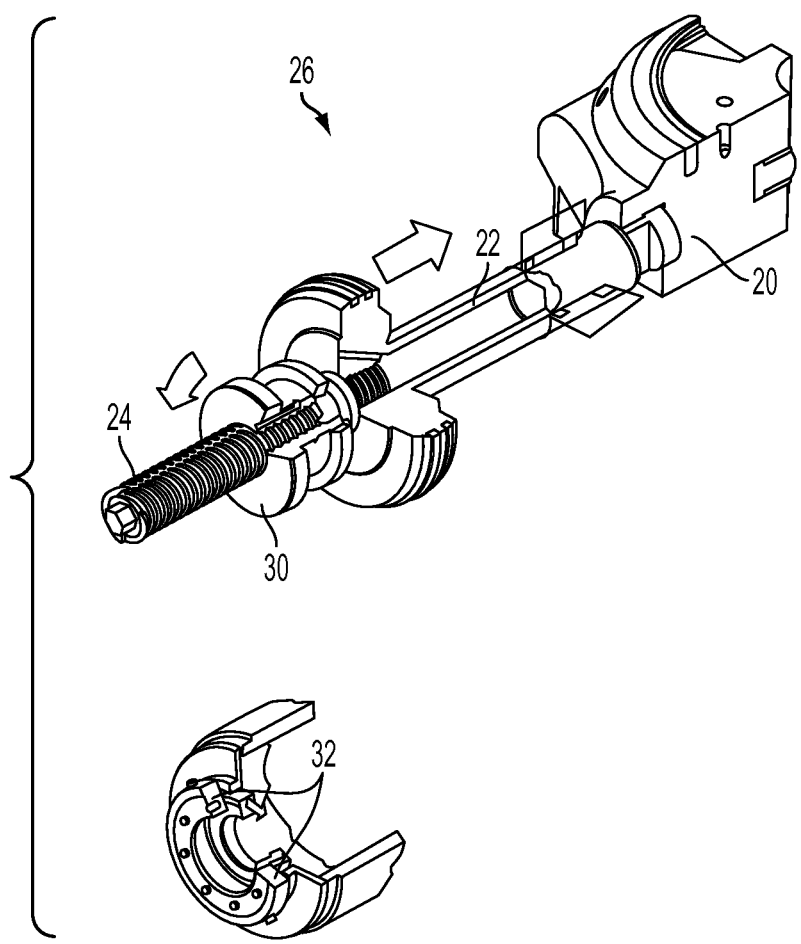
FIG. 3 is a schematic diagram of a ram locking mechanism.

The ram locking mechanism 26 of FIG. 3 may include a lock nut 30 that is disposed on the extension piston 24. A clutch 32, disposed around the lock nut 30, is configured to lock the lock nut 30, thus locking the extension piston 24. After a closing pressure applied (indirectly) to the piston 22 closes the ram block 20, the ram locking mechanism 26 locks the ram block 20 in place. Even when the closing pressure is released and no pressure acts on the piston 22, the ram locking mechanism 26 keeps locked the extension piston 24, which is a safety measure. When components of the ram locking mechanism 26 are used repeatedly, they become worn and they may not be able to maintain fix the extension piston 24 after the closing pressure is released. Under these circumstances, according to an exemplary embodiment, a supplemental closing pressure needs to be applied to better seal the bore. According to another exemplary embodiment, the ram locking mechanism should be scheduled for maintenance as will be discussed later.

Still with regard to FIG. 2, the ram block 20 and the piston 22 move against the pipe 18 to seal the well 10 after the closing pressure has been applied in closing chamber 34. When the closing pressure is applied to the closing chamber 34, the ram locking mechanism 26 releases the extension piston 24, such that the piston 22 may move. Once the block ram 20 presses against the pipe 18 and the closing pressure is released, the ram locking mechanism 26 locks the extension piston 24. After the closing pressure is released and the ram locking mechanism 26 has locked the extension piston 24, it may be observed that the ram block 20 and the piston 22 may move backwards when the ram locking mechanism 26 is worn. The ram block 20 and the piston 22 may move back, toward the ram locking mechanism 26, under the high pressure existent in the well 10. The back movement of the ram block 20 and piston 22, while the ram locking mechanism is locking them, is called backlash.

A large amount of backlash may indicate that parts of the ram locking mechanism 26 are worn and need maintenance and/or that a supplemental closing pressure needs to be applied to the closing chamber 34 for sealing the well. Thus, by being able to evaluate the amount of backlash in the piston 22 it is possible to determine when to perform maintenance of the ram locking mechanism 26 and/or provide the supplemental closing pressure to the piston 22. Some exemplary numbers that are not intended to limit the scope of the exemplary embodiments but to give the reader a specific example for a better understanding are as follows. When the ram locking mechanism has no worn parts, no backlash is expected. When the ram locking mechanism needs maintenance, the backlash of piston 22 may be between about 0.2 cm to about 0.5 cm, depending on the type and characteristics of the BOP.

Thus, the detection of backlash in the BOP may signal at least two matters. A first matter is that some parts of the ram locking mechanism 26 are worn and this mechanism may need maintenance. A second matter is that a supplemental closing pressure may need to be applied to the piston 22 to ensure that the bore is sealed. The backlash may be determined, according to an exemplary embodiment, by following the steps illustrated in FIG. 4.

According to step 400, a position of the piston 22 (or ram block 20 or supplemental piston 24) is determined when the well is sealed (i.e., no substantial leak is detected from the well), the ram rubber is new, i.e., not worn, and the closing pressure applied to piston 22 is released. In step 402, this position is set as the reference position. In step 404, the ram blocks are closed during normal operation, the ram locking mechanism locks the ram blocks, and the closing pressure is released. This step may happen any time after the reference position was set and at this step 404, the wear condition of the locking mechanism may not be known. In other words, step 404 is later in time than step 400. In step 406 the current position of the piston 22 is determined. The current position may be determined after the ram block 20 has sealed the well 10. The current position may be determined every day, every week, every second week, every time the BOP is tested, etc. In step 408, the current position is compared to the reference position. If the current position measured in step 406 is detected to be larger than the reference position in step 408, then in step 410 the difference between these two positions is calculated and compared to a predetermined threshold value. The predefined threshold value may be between 0.2 and 0.5 cm. However, these values depend on the size of the BOP, its pistons and the diameter of the well among other parameters. If the calculated difference is larger than the threshold value, an alert may be sent in step 412 to the operator of the rig to, for example, reapply the closing pressure to the closing chamber 34 for sealing the well. The alert may also inform the operator that maintenance of the ram locking mechanism is due. The operator may choose to reapply the closing pressure to reduce the backlash. However, if the current position of the piston is smaller than the threshold position in step 408, the process goes back to step 406.

According to another exemplary embodiment, a first threshold may be set up for indicating that applying the closing pressure is recommended and a second threshold may be set up for indicating that maintenance of the locking mechanism is due. The second threshold may be larger than the first threshold. In other words, the system may be setup to initially apply closing pressure to correct the backlash and only then to signal maintenance of the ram locking mechanism, when the backlash is larger than a predetermined value.

Figure 4:
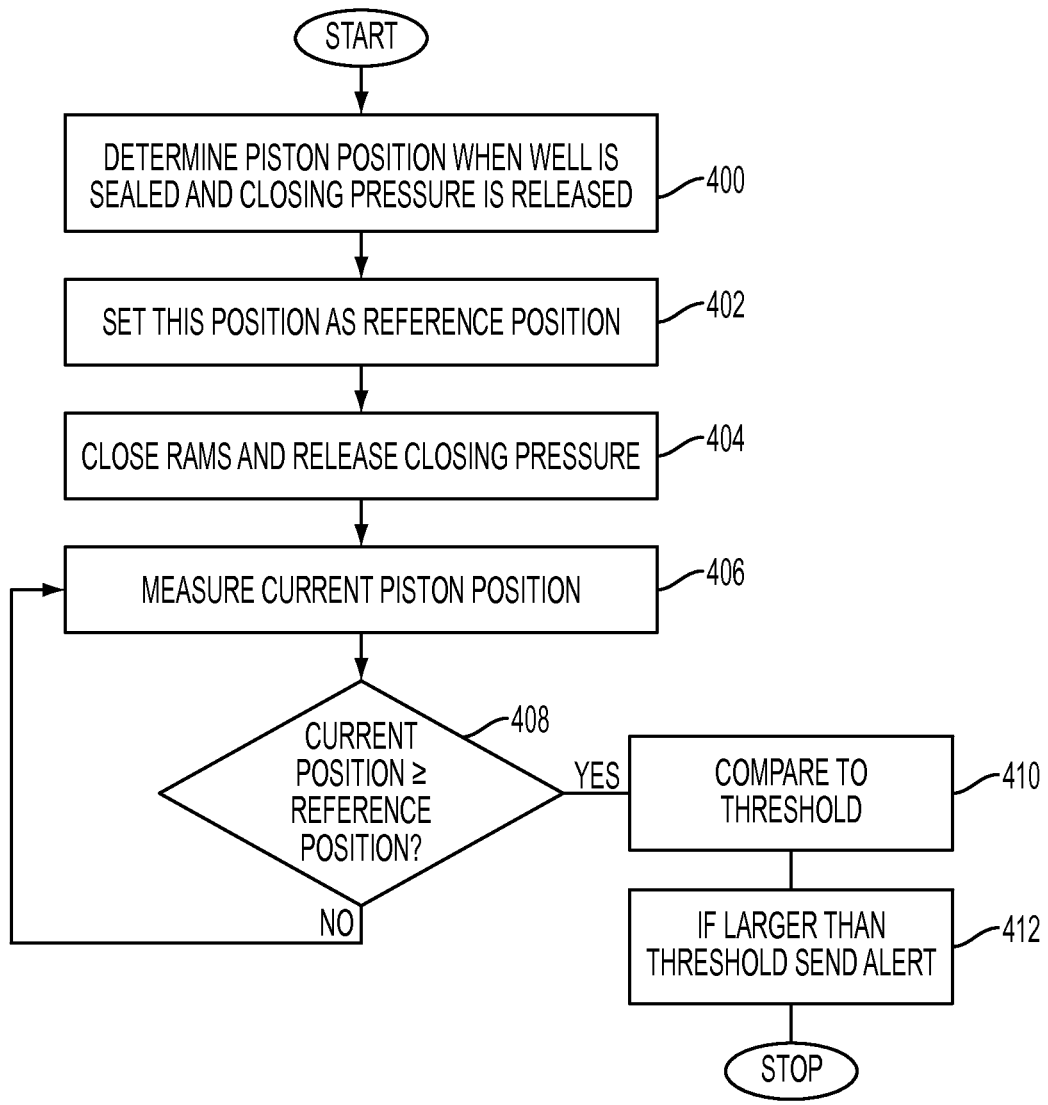
FIG. 4 is a flow chart illustrating steps of a method for generating an alert when a backlash is determined in the BOP, according to an exemplary embodiment.

The steps of the method illustrated in FIG. 4 may be implemented in a computing system that includes a processor. Such a computing system is described in details with regard to FIG. 27. The computing system may be implemented on a ship or rig, above the sea surface and may be configured to be electrically connected to the position sensing mechanism such that the computing system receives a signal indicative of the position of the piston relative to the body of the BOP 16. Also, the computing system may be connected to those elements of the BOP and the system controlling the BOP that provide the closing pressure, for controlling the supply and release of the closing pressure based on the readings received from the position sensors of the BOP.

Figure 5:
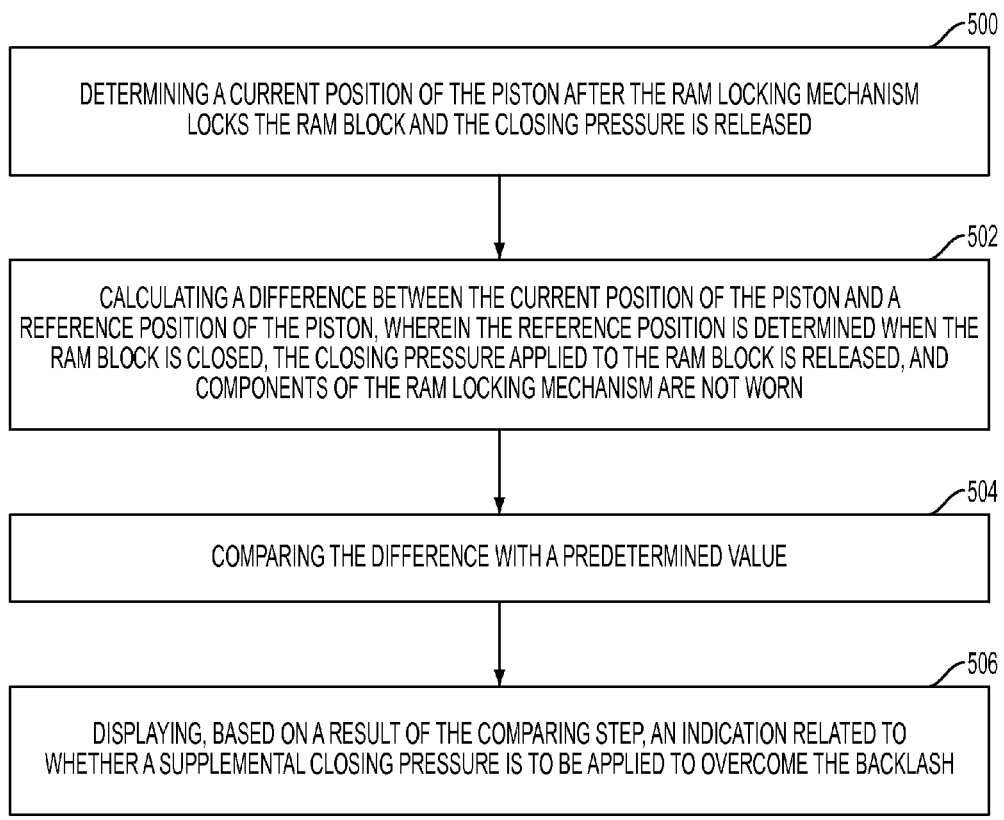
FIG. 5 is a flow chart illustrating steps of a method for determining the backlash according to an exemplary embodiment.

Steps of a method that implements the process shown in FIG. 4 are discussed with regard to FIG. 5. According to this embodiment, there is a method for sensing a backlash of a ram block of a blowout preventer attached to a well, in which a closing pressure is applied to a piston connected to the ram block to close the ram block for sealing the well. The method includes a step 500 of determining a current position of the piston after the ram locking mechanism locks the ram block and the closing pressure is released, a step 502 of calculating a difference between the current position of the piston and a reference position of the piston, where the reference position is determined when the ram block is closed, the closing pressure applied to the ram block is released, and components of the ram locking mechanism are not worn, a step 504 of comparing the difference with a predetermined value, and a step 506 of displaying, based on a result of the comparing step, an indication related to whether a supplemental closing pressure is to be applied to overcome the backlash.

According to an exemplary embodiment, the applied closing pressure may correct the backlash. However, according to another exemplary embodiment, the backlash appears as soon as the closing pressure is released. If the backlash is severe, for example, more than 0.5 cm, the backlash may indicate that the ram locking mechanism needs maintenance. Accordingly, the system may be configured to inform the operator that maintenance of the ram locking mechanism is recommended.

The positions of the ram blocks may be used for other purposes as will be discussed later. For example, the positions of the ram blocks may be used for determining a wearing of the rubber (elastomer) of the ram blocks. The rubber ensures a good seal between the ram blocks and the pipeline 18 as discussed above with regard to FIG. 2. In the eventuality of an incident in the well, the pressure in the well, below the ram blocks, is maintained as the ram blocks together with the rubber seals off the well. Thus, the condition of the rubber should be known by the operator for a safe utilization of the well.

Figure 6:
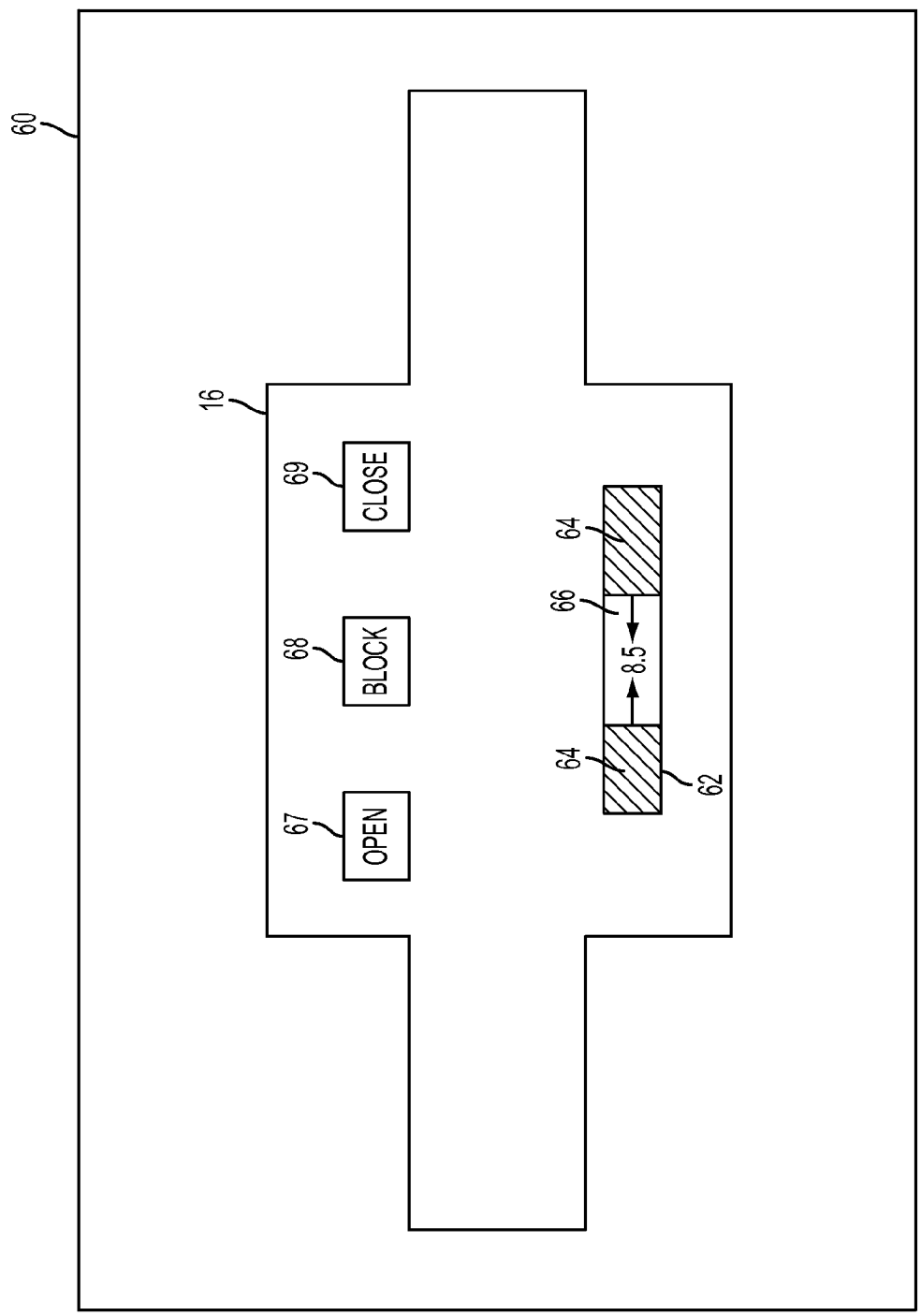
FIG. 6 is a schematic diagram of a user interface according to an exemplary embodiment.
Figure 27:
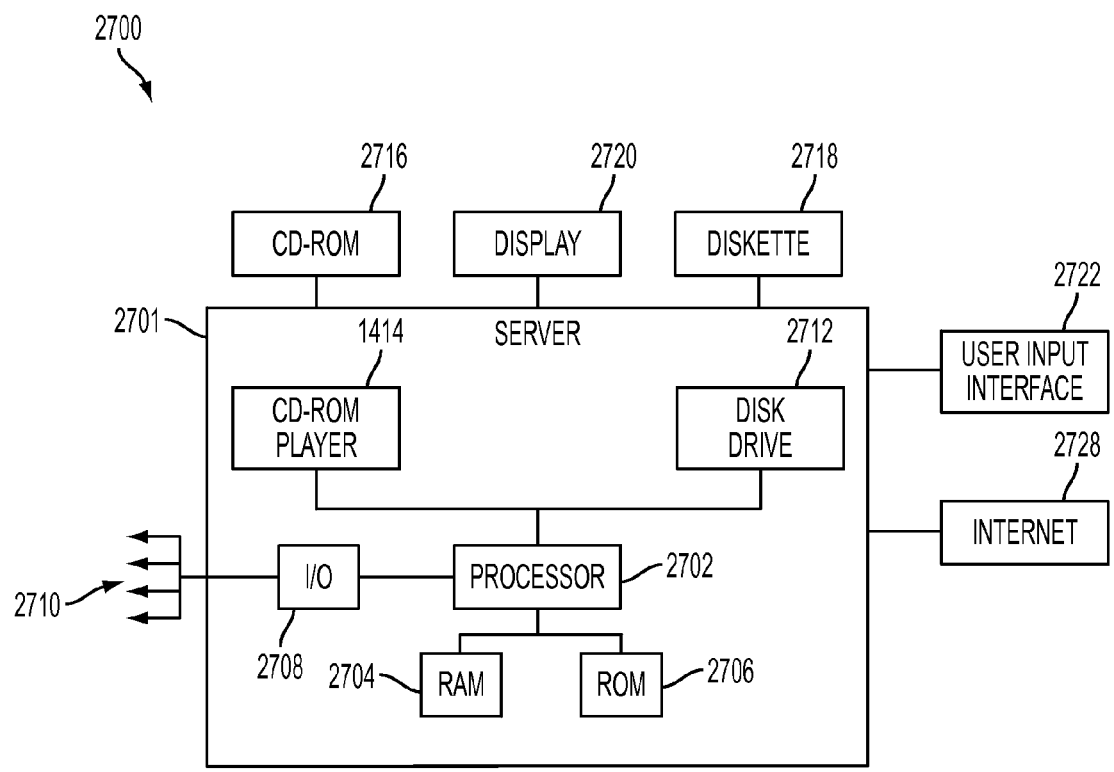
FIG. 27 is a schematic illustration of a computing device.

According to an exemplary embodiment, first and second positions of the ram blocks may be displayed by a user interface on the computer system to be discussed with regard to FIG. 27. FIG. 6 shows an exemplary user interface in which the ram BOP 16 is shown schematically on a display 60. Display 60 may be a computer monitor provided in the command room of the operator. A slider unit 62 shows two blocks 64 having a gap 66 between them. The two blocks 64, which correspond to the ram blocks 20, move towards each other when the actual ram blocks 20 are closing and away from each other when the ram blocks 20 are opening. A size of the gap 66 may be numerically indicated as shown in FIG. 6. The gap 66 may be defined by the positions of rubbers 38 shown in FIG. 2.

Buttons 67-69 may be added for making aware the operator of the rig about the following states of the BOP. In one embodiment, buttons 67-69 have a default first color, which indicates that the functions associated with these buttons are not activated. When the BOP 16 is open, button 67 may change its color, for example, becomes brighter than the other buttons 68 and 69, for alerting the operator that the BOP is open. The same is true for button 69 when the BOP is closed. Button 68 may change its color when the ram blocks 20 are locked by the ram locking mechanism. Thus, when the ram blocks 20 are open and no closing pressure is applied on them, both buttons 67 and 68 are active for informing the operator that the BOP is open and the ram locking mechanism is locking the ram blocks 20. Alternatively, buttons 68 and 69 may similarly be active together. Other buttons may be added as would be recognized by those skilled in the art for informing the operator about the state of the rig.

Figure 7:
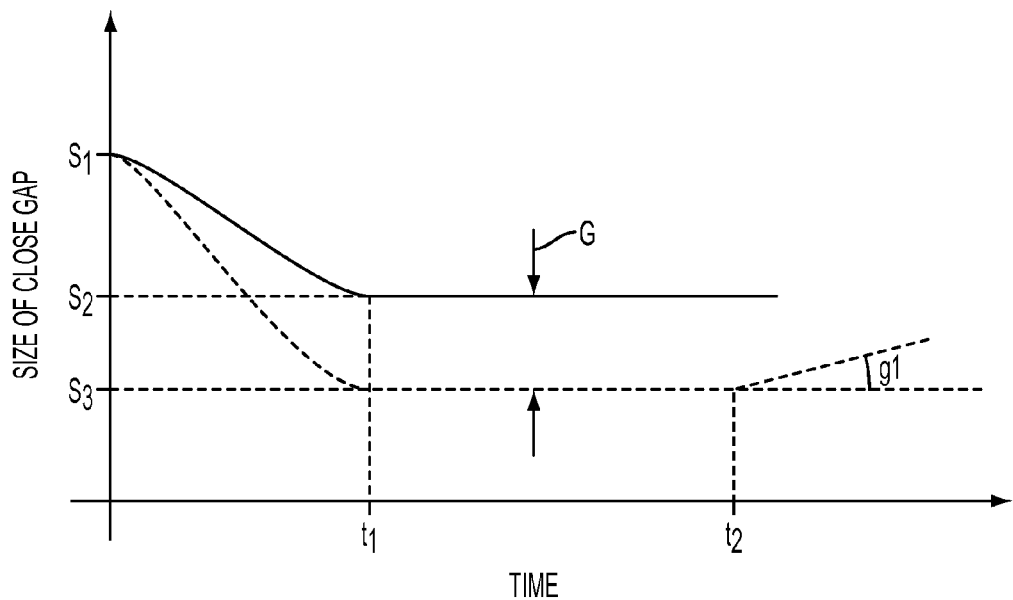
FIG. 7 is a graph showing a size of a gap of ram blocks during closing according to an exemplary embodiment.

According to another exemplary embodiment, another user interface may be used for informing the operator of the rig about the status of the BOP. The data used for this user interface and the data used for the user interface shown in FIG. 6 may be identical, i.e., the positions of the ram blocks 20 relative to the body of the BOP 16. As shown in FIG. 7, a solid line shows a size of the gap between the ram blocks 20 for one closing cycle, i.e., starting at a time zero when the ram blocks 20 are open until a time t2, when the ram blocks 20 are closed. The solid line is a baseline, i.e., it is determined when the elastomer 38 of the ram blocks 20 is new and the ram blocks 20 are closing. This baseline may be specific to each BOP. FIG. 7 shows that a gap between the ram blocks 20 is S1, when the ram blocks 20 are open. As the ram blocks are closing, at a time t1, the gap between the ram blocks 20 becomes S2, which is smaller than gap S1. From t1 to t2 the size of the gap remains substantially constant as t2 is a time before the closing pressure is released. In other words, FIG. 7 does not include any effect from the backlash. When the backlash is present, the size of the gap may increase after time t2. However, this possibility is discussed later.

In one application, S1 may be 60 cm, S2 may be 30 cm, t1 may be 30 s and t2 may be 50 s. The gap S3 that is detected after the ram blocks 20 have closed a certain number of times is smaller than the gap S2 of the baseline for the following reasons. Although the gap between the ram blocks 20 is substantially constant (the gap is dictated by the size of the drill pipe existing in the BOP), the graph shows a difference in gap S2 and S3 due to the elastomer 38 wear during the closing/opening cycles. In order to compensate for the worn elastomer 38 to close around the drill pipe, the ram blocks 20 have to travel further as the elastomer wears off, thus generating the smaller gap S3. In other words, as the elastomer 38 is experiencing additional closing cycles, a size of the elastomer decreases due the wearing, thus determining the ram blocks to travel further to account for the reduced size of the elastomer. The wearing determines the dash line in FIG. 7 to be lower than the solid line.

Thus, as the elastomer 38 of the ram blocks 20 becomes worn, the size of the gap follows the dashed line shown in FIG. 7, i.e., the size of the gap becomes smaller. When a difference G between the gap for the solid line (baseline, reference measurement) and the gap of the dashed line (current measurement) is larger than a predetermined value, this is an indication that the elastomer is worn and it needs to be replaced. The predetermined value may be between about 0.2 cm and about 0.5 cm.

Figure 8:
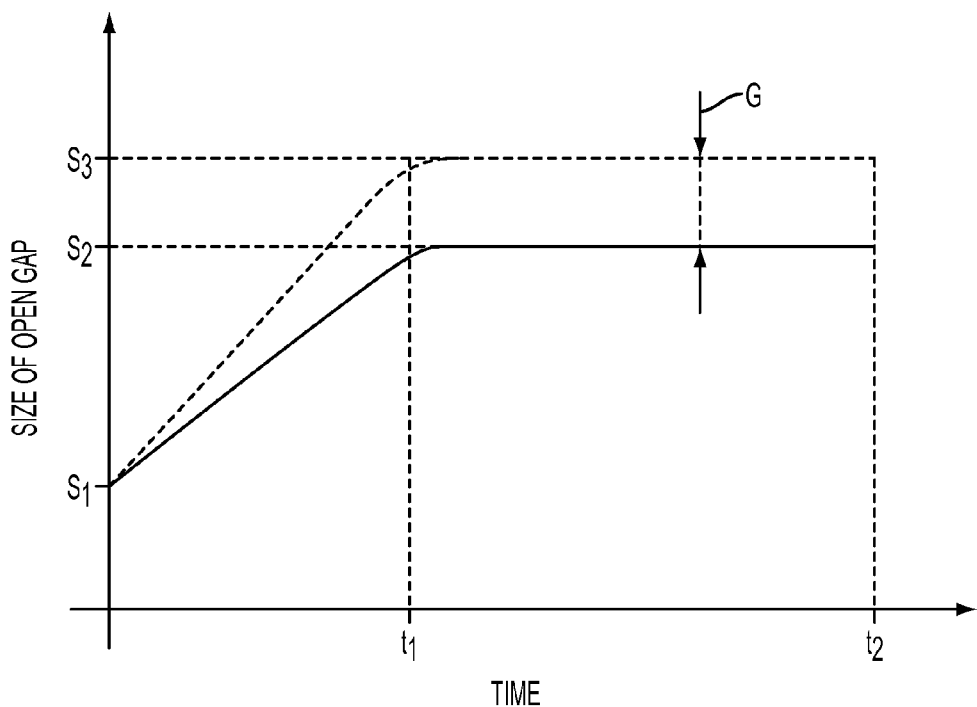
FIG. 8 is a graph showing a size of a gap of ram blocks during opening according to an exemplary embodiment.

A similar graph (but reversed) is true for the opening gap of the ram blocks 20. This application is shown in FIG. 8 and an explanation for FIG. 8 is similar to that of FIG. 7. Thus, this explanation is not repeated herein. One difference between FIGS. 7 and 8 is that the baselines are obtained by determining closing and opening signatures, respectively, of the BOP. As the gap is determined by both ram blocks 20, according to an exemplary embodiment, a position sensor for each of the ram blocks is provided and the computing system calculates the gap based on both readings of the ram blocks 20. Also it is noted that for determining whether the elastomer is worn, a graph indicating the positions of the ram blocks inside a horizontal bore of the BOP 16 versus time is used.

According to another exemplary embodiment, a user interface that indicates the gap and a wear status of the ram locking mechanism is shown in FIG. 7. If the position of the ram blocks 20 is recorded beyond time t2 in FIG. 7, and it is assumed that at time t2 the closing pressure is released and the ram locking mechanism 26 is locking the ram blocks 20, a non-zero slope curve, as shown in FIG. 7 (after time t2) indicates that the ram blocks 20 are not hold in place by the ram locking mechanism and in effect, the ram blocks 20 move further apart under the pressure from the well. The gradient (slope) g1 is indicative of this effect. In one application, the portion of the graph in FIG. 7 between t1 and t2 may have a non-zero slope (g0). For this situation, g1 is still different from g0. Establishing a predetermined slope $g_{ref}$ as being a reference threshold above which the ram locking mechanism is considered worn, the operator of the rig may be provided with the graph shown in FIG. 7 for determining when the ram locking mechanism needs maintenance. Alternatively, the computer system may determine, without input from the operator, whether an alert should be sent to the operator as the determined slope is larger than the threshold slope. Other ways for graphically presenting the slope g1 to the user may be used as would be appreciated by the those skilled in the art.

Figure 9:
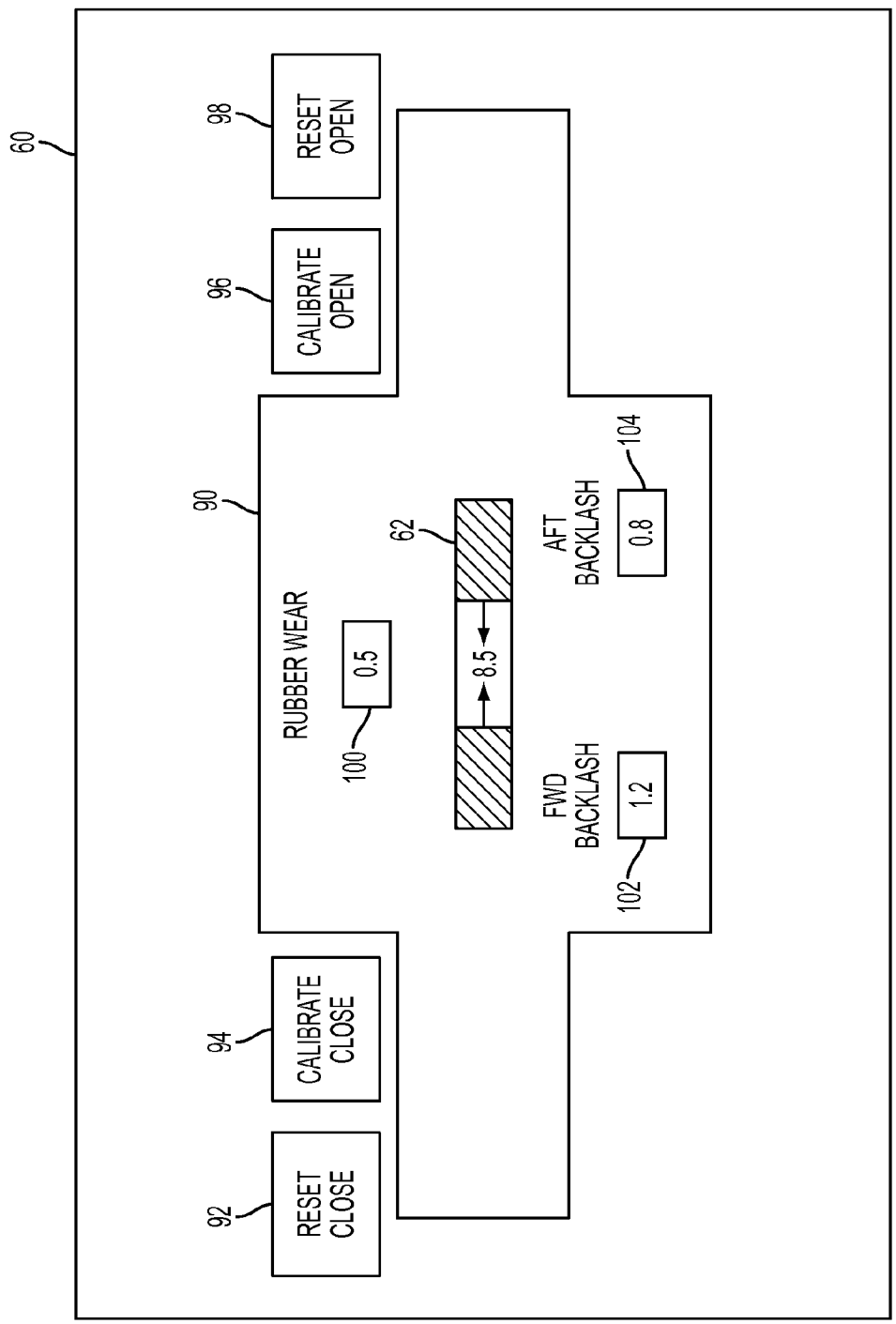
FIG. 9 is a schematic diagram of a user interface according to an exemplary embodiment.

While FIG. 6 shows a user interface in which the gap between the ram blocks is illustrated as a real gap (66) between two blocks (64) and FIGS. 7 and 8 show a user interface in which the gap is illustrated as a graph, according to another exemplary embodiment, a user interface that indicates the gap similar to FIG. 6 and a wear status of the ram locking mechanism is shown in FIG. 9.

FIG. 9 shows the user interface that may be displayed on a screen of the computer system for informing the operator of the rig about the status of the elastomer and the status of the ram locking mechanism. FIG. 9 shows a representation 90 of the BOP 16 on a display 60. Around the representation 90 of the BOP 16, plural buttons 92, 94, 96, and 98 are provided for indicating various states of the BOP 16. For example, in one application, button 92 may be configured to reset the system when the elastomer has been changed. In another application, button 94 may be configured to reset the system when a position sensor is replaced. The resetting may be desirable as a new position sensor may produce a different position reading than the former sensor and/or a new elastomer may have a different size than the previous new elastomer. Buttons 96 and 98 are similar to buttons 92 and 94, but for the closing cycle. As would be appreciated by those skilled in the art, these buttons may be "soft buttons," i.e., implemented by software in a touch screen or may implemented as hard buttons attached to the screen.

FIG. 9 also shows a bar 62 indicating the positions of the ram blocks 20, a field 100 displaying an amount of the elastomer (rubber) wear, and fields 102 and 104 displaying an amount of backlash for each of the ram blocks 20. The amount of backlash in each ram block may be different as illustrated in FIG. 9. The backlash of each ram block may be determined by measuring a position of the corresponding ram block when the closing pressure is on and the BOP is closed and measuring a position of the same ram block after the closing pressure has been released. This process may be performed for each ram block. The gap between the ram blocks shown in bar 62 may be calculated by the computing system based on the positions of the ram blocks when closed. The rubber wear shown in field 100 may be the gap G (or a mathematical quantity determined based on G, for example, G/2) shown in FIGS. 7 and 8.

Figure 10:
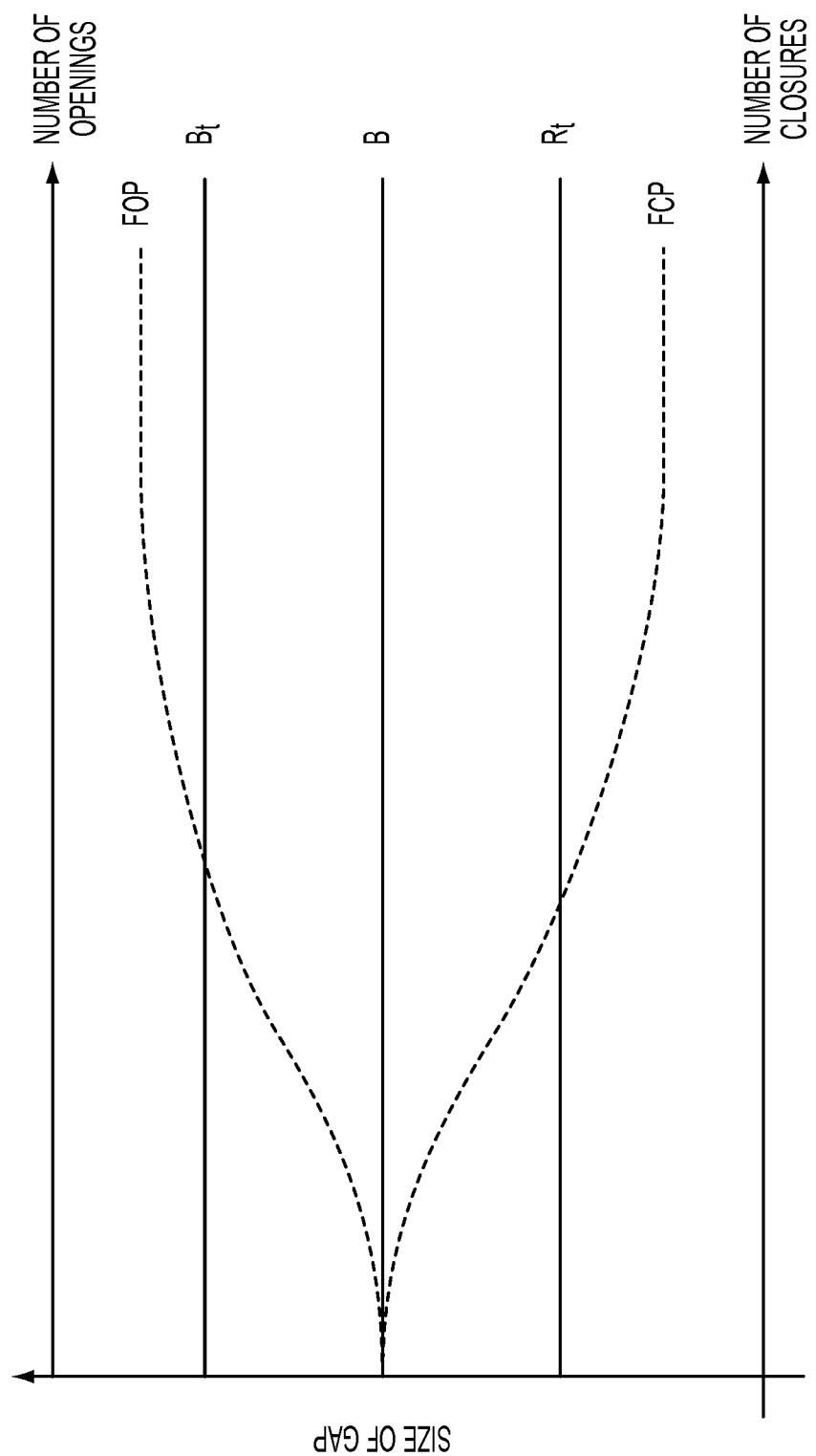
FIG. 10 is a graph showing a size of a gap versus number of closures or openings of ram blocks according to an exemplary embodiment.

Another user interface that may be provided to the operator of the rig for determining the elastomer wear and/or the backlash amount is discussed with regard to FIG. 10. FIG. 10 shows a baseline B for the close position of the ram blocks and the baseline B is indicative of a size of the gap between the ram blocks 20. FIG. 10 illustrates the position of only one ram block relative to a reference position (baseline B), which is considered to be the position of the ram block when the BOP is closed and the elastomer is not worn. The size of the gap (in fact half of the actual gap) is plotted on the Y axis, a number of openings of the ram block is plotted on an upper X axis, and a number of closings of the ram block is plotted on a lower X axis. Line Bt indicates a backlash threshold and the line Rt indicates an elastomer wear threshold. Values for the thresholds and gaps are BOP specifics and are set based on observations.

More specifically, when considering the opening of the ram block, curve FOP corresponds to the future open positions of the selected ram block while curve FCP corresponds to the future close positions of the selected ram block. All these curves may be determined by the computer system, based on the readings from the position mechanism, and the curves may be displayed on the display as shown in FIG. 10. When the FOP is above the Bt, a backlash in the selected ram block exceeds an admissible value and the operator may reapply the closing pressure to reclose the BOP and/or decide to replace the worn parts of the ram locking mechanism. When the FCP is below the Rt, an elastomer wear exceeds an admissible value and the operator may decide to replace the elastomer. These decisions may be made by the computer system and the operator may be informed, for example, with corresponding alerts, that the ram locking mechanism is worn and/or the closing pressure should be reapplied and/or the elastomer is worn and should be replaced.

A difference between determining the reference position for the elastomer wear and the reference position for the backlash is that the closing pressure is maintained when determining the reference position for the elastomer wear while the BOP is vented (i.e., closing pressure released) when determining the reference position for the backlash.

Figure 11:
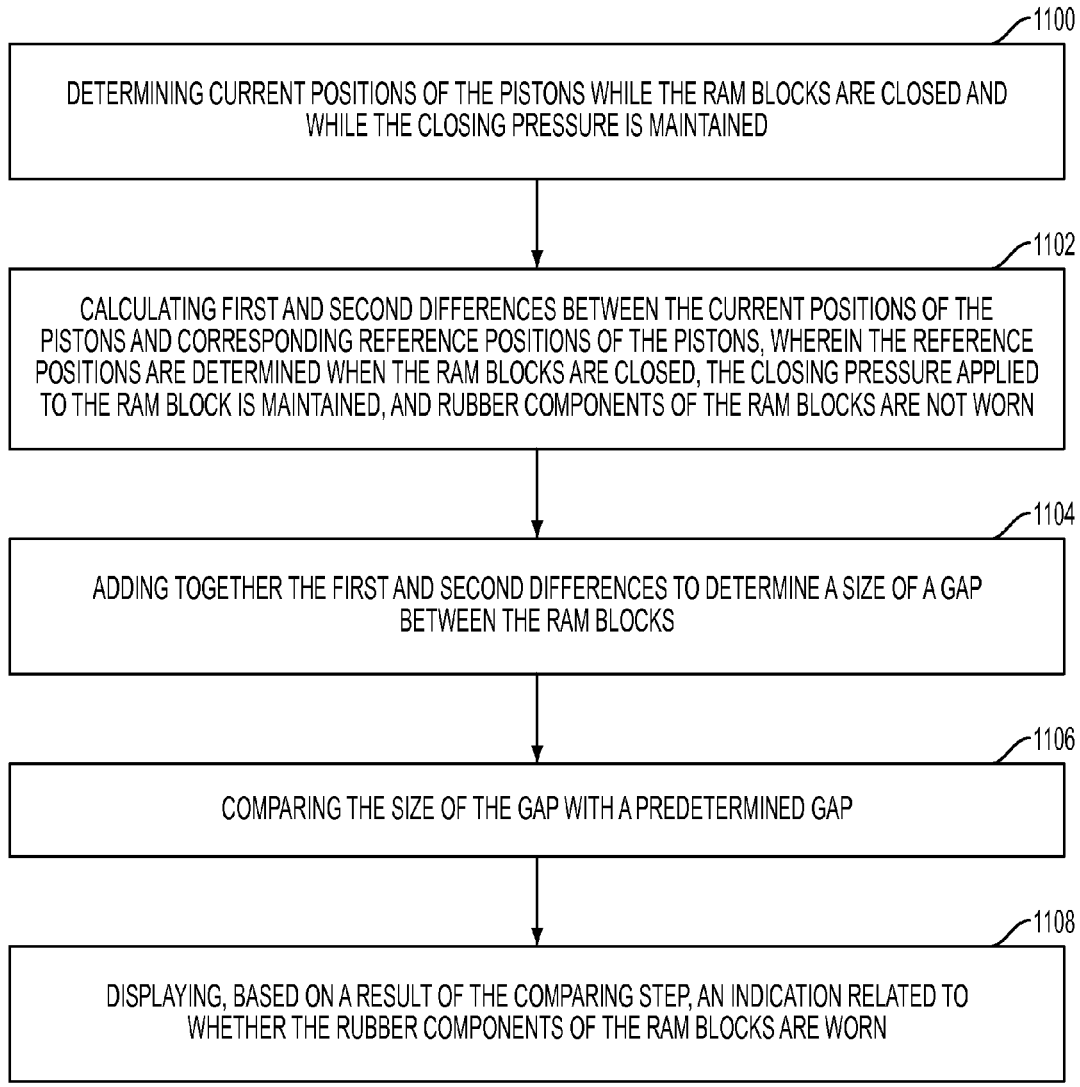
FIG. 11 is a flow charts illustrating steps of a method for determining when rubber components of the ram blocks are worn.

According to an exemplary embodiment illustrated in FIG. 11, there is a method for recording positions of ram blocks of a blowout preventer to be attached to a well, in which a closing pressure is applied to pistons connected to the ram blocks to close the ram blocks for sealing the well. The method includes a step 1100 of determining current positions of the pistons while the ram blocks are closed and while the closing pressure is maintained, a step 1102 of calculating first and second differences between the current positions of the pistons and corresponding reference positions of the pistons, wherein the reference positions are determined when the ram blocks are closed, the closing pressure applied to the ram block is maintained, and rubber components of the ram blocks are not worn, a step 1104 of adding together the first and second differences to determine a size of a gap between the ram blocks, a step 1106 of comparing the size of the gap with a predetermined gap, and a step 1108 of displaying, based on a result of the comparing step, an indication related to whether the rubber components of the ram blocks are worn.

Figure 12:
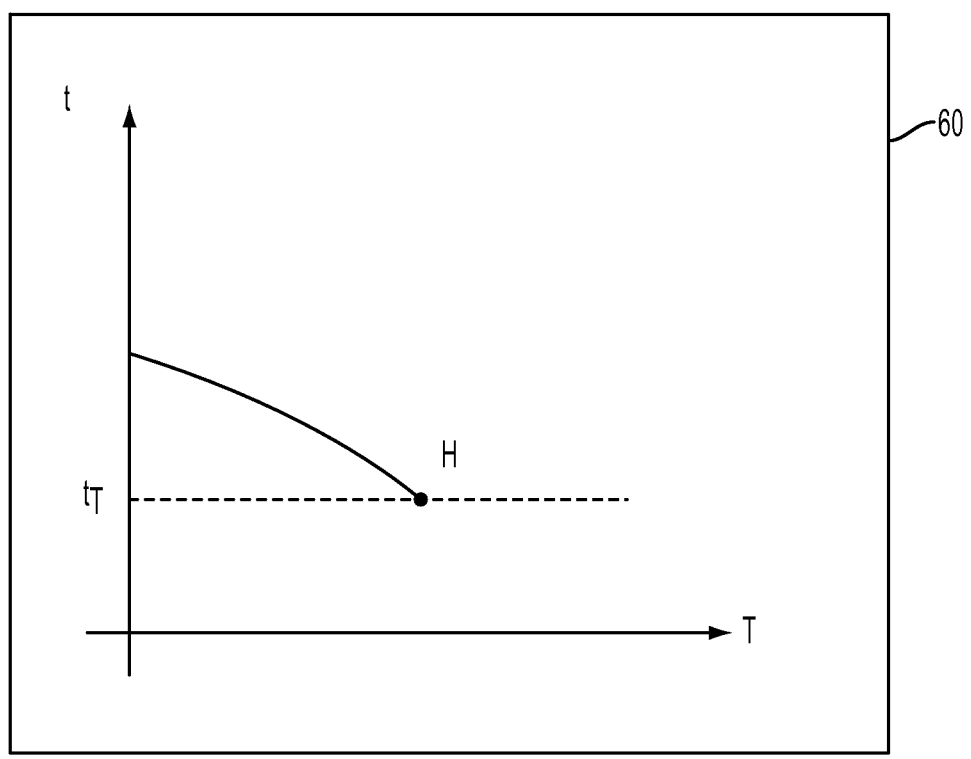
FIG. 12 is a graph showing a curve corresponding to current positions of the ram block according to an exemplary embodiment.

According to another exemplary embodiment, the position data from the position mechanism 27 may be provided to the computing system of FIG. 27, which may display on a screen a size "t" (see FIG. 12) of the gap G (see FIG. 7) versus time T as shown for example in FIG. 12. A difference between the graph of FIG. 12 and that of FIG. 7 is that the present graph illustrates the size t of the gap G over an extended time period, i.e., over multiple closing/opening cycles of the BOP 16. In this regard, FIG. 7 shows the size of the gap G for one closing. By recording the size t of the gap G over multiple cycles, it is possible to see a trend of the size of the gap G, i.e., the size of the gap decreases as the elastomer is worn off. Thus, the operator of the rig may see on the screen 60 a plot of the size "t" of the gap between the surfaces of the ram blocks 20. In one application, the size t of the gap G is measured between the faces of the ram blocks 20 that face each other during closing. More specifically, if one would manually measure with a ruler the size t of the gap G, the measurement would be performed between the two faces of the ram blocks facing each other but at a location of the face that is different from the location of the rubber. Once the size t reaches a predetermined size threshold $t_T$, the computing system may produce an alarm/alert to make the operator aware of the need to change the elastomer 38. The predetermined thickness threshold may be between zero and 0.5 cm. However, these are exemplary numbers not intended to limit the scope of the embodiments. Once the data for plotting the graph shown in FIG. 12 is determined for a specific elastomer and BOP, the data may be stored in a memory in the computing system and used for similar elastomers and BOPS. Thus, an operator having this data available, by simply measuring the size t of the gap G, may determine, based on the graph of FIG. 12, how "far" he is from performing maintenance due to a worn elastomer. This features allows the operator to schedule the maintenance at his convenience.

According to another exemplary embodiment, the position of the piston 22 may be used prior to deploying the BOP system 16 to the well for determining an appropriate shape and size of the elastomer 38 to be placed into the ram block 20. In other words, the position data of the ram blocks 20 may be used for ram seal development and testing to determine how elastomers deform when the ram block 20 is closed. For example, a protruding size of the part of the elastomer 38 that protrudes out of the face of the ram block 20 may be determined by knowing the position of the ram block 20. In this respect, it is noted that prior to deploying the ram block 20 undersea, the protruding size of the elastomer has to be established for achieving a good seal of the well. If the protruding size is less than a predetermined size, the well may not seal properly. If the protruding size is more than the predetermined size, the well also may not seal properly.

Although FIG. 2 shows the ram block 20, the elastomer 38 and the pipe 18 in contact to each other, it is noted that for a BOP 16, these elements may not be seen when the BOP is fully assembled. Thus, the shape of the elastomer 38 is not visible and the protruding size may not be directly measures.

Figure 13A:
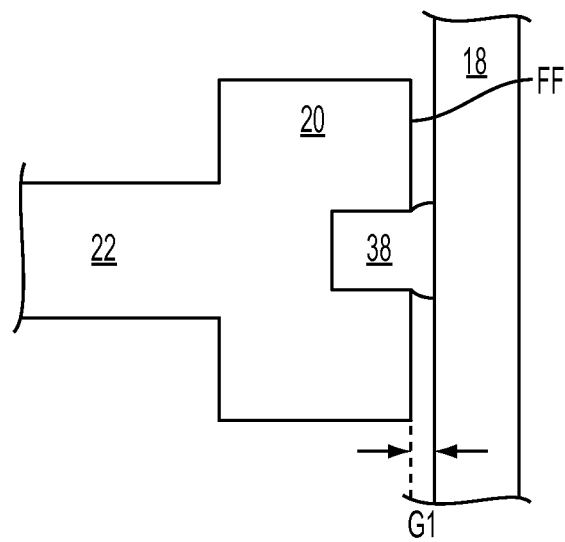
FIGS. 13A and 13B are schematic diagrams of a ram block having an elastomer that is pressed against a pipe for determining a shape of the elastomer according to an exemplary embodiment.
Figure 13B:
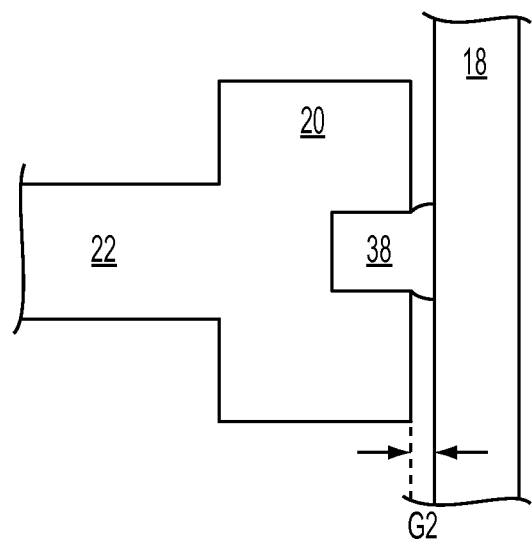

As shown in FIG. 13A, the elastomer 38, when pressed by the ram block 20 against the pipe 18, (i) either may extend outside the front face FF of the ram block 20 or (ii) may not fully fill the cavity in which it is placed. In other words, the gap G1 measured when the ram block 20 is closed and the elastomer 38 is new may have to be within a predetermined range in order to properly seal the well. The gap G1 may be measured by performing two measurements, i.e., a measurement for determining the position of the piston 22 when the ram block 20 is closed and no elastomer 38 is present and a measurement for determining the position of the piston 22 when the ram block 20 is closed and a new elastomer 38 is present. A difference between these two positions provides the gap G1.

Figure 14:
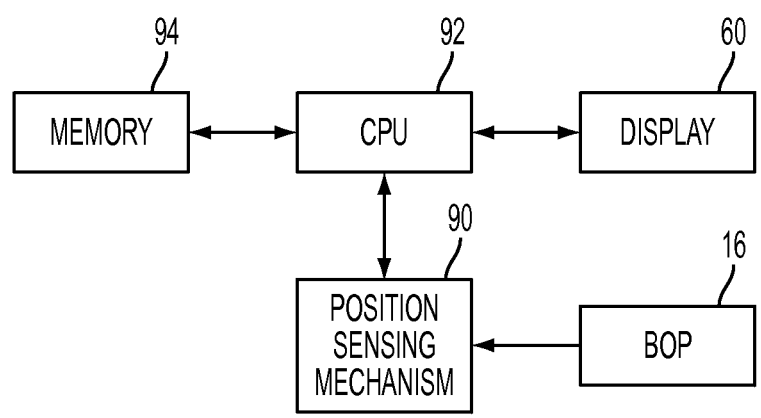
FIG. 14 is a schematic illustration of a system for development and testing of the blowout preventer according to an exemplary embodiment.

An exemplary embodiment that describes the system for determining the gap G1 is illustrated in FIG. 14. The BOP 16 is connected to or may include a position sensing mechanism 90. The position sensing mechanism 90 may be one of those described in the Background section or another mechanism that is capable of detecting the position of the piston 22 or the ram block 20. The position sensing mechanism 90 may include mechanism 27 shown in FIG. 2. The position sensing mechanism 90 may be connected, via a cable for example, to a processor 92, which may part of a computing device. The processor 92, which may be provided on the rig while the position sensing mechanism 90 may be provided undersea, is configured to receive data from the position sensing mechanism and to store that data, if required, in a memory 94. Also, the processor 92 may store the calculated quantities in the memory 94. The processor 92 may also be connected to a display 60 for displaying the position of the ram block, information related to the locking pressure, a thickness of the wear pad of the pair of ram blocks, the shape of the wear pad, the protruding size of the elastomer, and/or the closing pressure.

Figure 15:
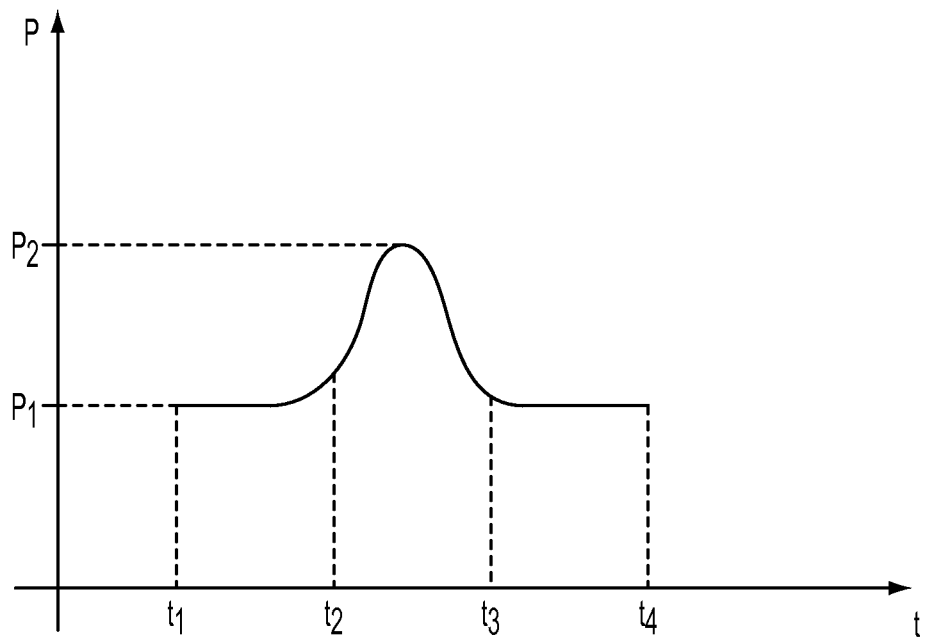
FIG. 15 is a graph showing a profile of a pressure applied to the ram block while shearing a pipe according to an exemplary embodiment.

According to another exemplary embodiment, the position data of the piston 22 may be used for a shear ram BOP to apply an increased pressure just before shearing the pipe. As already discussed, the shear ram not only seals the well 10 but also shears a pipe 18 if pipe 18 is present inside the well 10. In terms of pressure, FIG. 15 shows a profile of the desired pressure versus time to be applied to the piston 22 when closing the shear ram. More specifically, the pressure p1 applied to the piston 22 is substantially constant when the ram blocks 20 are moving toward the pipe 18. For this regime, not much pressure is necessary. However, when the ram blocks 20 touch at time t2 pipe 18, an increased pressure p2 is required for shearing the pipe. Thus, the maximum pressure of an accumulator or another source should be released to the ram blocks between t2 and t3. After t3, when the pipe 18 has been sheared, until a future time t4 when the rams are closed, a low pressure may be applied to the piston 22 to further close the ram blocks 20.

Figure 16:
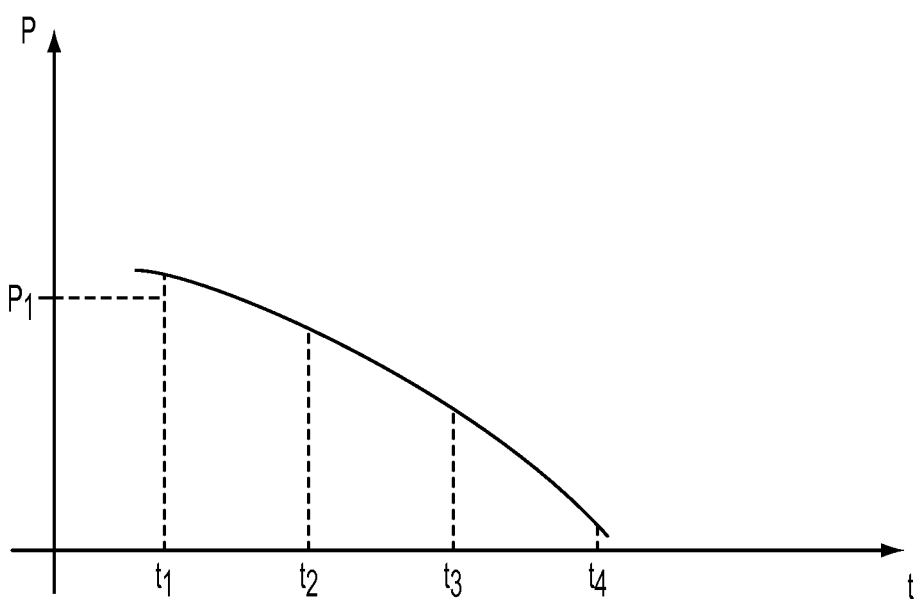
FIG. 16 is a graph showing a profile of a pressure applied to the ram block according to a conventional technique.

The pressure that is applied to the piston 22 may be provided by an accumulator. An accumulator includes one or more bottles filled, for example, with nitrogen at high pressure. When the pressure stored in the accumulator is released, a profile of the released pressure is shown in FIG. 16. The pressure released from the accumulator decreases with the passing of time. Thus, the pressure applied by the accumulator when shearing the pipe, between times t3 and t4, is lower than the initial pressure that is applied at time t1. It can be seen that there is a mismatch between the pressure needed for closing and shearing the pipe 18 as shown in FIG. 15 and the pressure available from the source as shown in FIG. 16. To compensate for this reduced pressure between times t2 and t3, a conventional method uses a large accumulator to generate a high enough pressure when the pipe is sheared. However, for this arrangement, the initial pressure is too high, the size of the accumulator is large, and the required number of accumulators is high.

Based on the position data that is available for the piston 22, according to an exemplary embodiment, the time t2 may be determined by the computing system, for example, by determining the position of the ram block 20 when the ram block touches the surface of the pipe 18. This specific position of the ram block 20 may be determined, for example, by using a pressure sensor that determines an increase in the pressure encountered by the ram blocks. Thus, when the position of the piston that corresponds to the time t2 is determined, a supplemental closing pressure, enough to reach the peak p2, may be released from a second accumulator, in addition to the already provided pressure provided by a first accumulator. In an exemplary embodiment, a second accumulator is used for providing the required supplemental pressure between timings t2 and t3, based on the determined corresponding positions of the piston 22. According to this exemplary embodiment, the supplemental pressure provided by the second accumulator may be switched off after t3.

According to an exemplary embodiment, the first accumulator that supplies the pressure between t1 and t2 may be a low pressure, high volume, accumulator, as the pressure necessary for moving the ram block 20 is low. Fewer accumulators are required to produce the low-pressure fluid volume resulting in a smaller footprint and lower cost for the system. The second accumulator, which supplies the difference in pressure between the pressure of the first accumulator and the pressure for shearing the pipe 18, may be a high pressure low volume accumulator, as this accumulator may be needed only for a short period of time, i.e., until the pipe is sheared. Alternatively, the position of the ram block 20 just before shearing the pipe may be estimated based on the size of the BOP and the pipe and this estimated position may be stored in a memory of the computing system. When in operation, the computing system determines a current position of the ram block and compares the current position with the estimated position. When the two positions are close, for example, one is +/−5% smaller or larger than the other, the computing system may be programmed to automatically activate the second accumulator to release the supplementary closing pressure.

Figure 17:
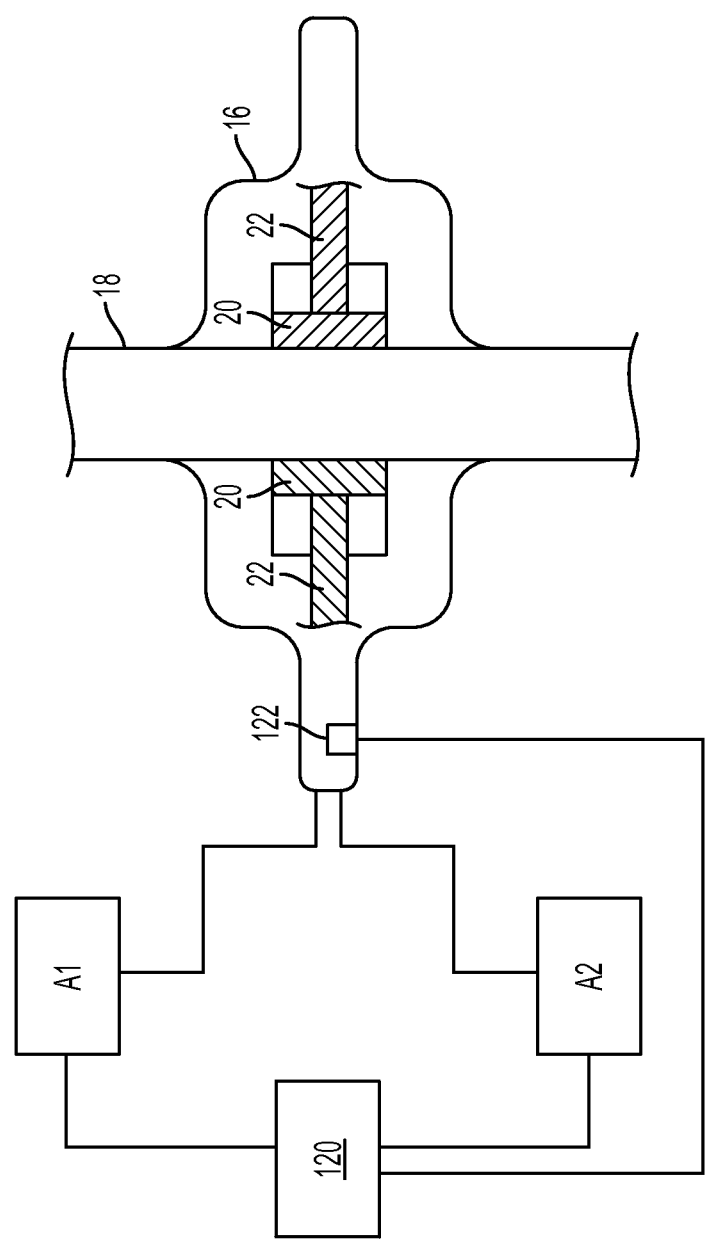
FIG. 17 is a schematic illustration of a blowout preventer with multiple accumulators for shearing the pipe according to an exemplary embodiment.

To better illustrate the situation of using two accumulators for shearing a pipe, an exemplary embodiment is discussed now with regard to FIG. 17. FIG. 17 shows the BOP 16 around the pipe 18 and the ram blocks 20 contacting the pipe 18. The pistons 22 are moved by the pressure applied by the first accumulator A1. When the ram blocks 20 start to shear the pipe 18, i.e., at time t2, the controller 120 (or another element of the computing system), after determining that a supplemental closing pressure is desirable, instructs the second accumulator A2 to release its pressure to the piston 22. The controller 120 makes this determination based on information (current position data of the ram block and stored reference position data and/or pressure increase exerted on the ram blocks) received, for example, from the LVDT device 122. According to an exemplary embodiment, the controller 120, still based on measurements received from the LVDT device 122, may evaluate the time t3 (which indicates the end of shearing the pipe 18) and may instruct the second accumulator A2 to suspend the pressure release as the pressure from the first accumulator A1 may be enough to complete the closing of the ram blocks 20. The controller 120 may be part of the computing system shown in FIG. 27 or may be an independent computing system that automatically triggers the opening and closing of the second accumulator A2 based exclusively on data received from the positioning device 122. Other arrangements are also possible in which less than two or more than two accumulators are used.

Figure 18:
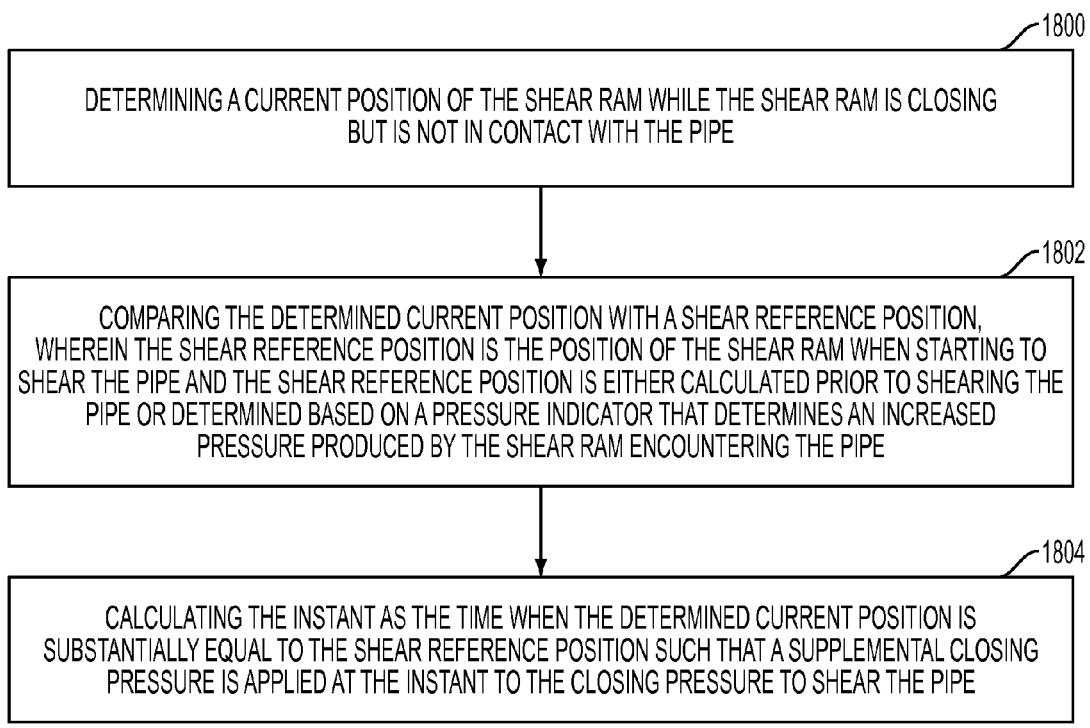
FIG. 18 is a flow chart illustrating steps of a method for applying different pressures to the ram block for shearing the pipe according to an exemplary embodiment.

According to an exemplary embodiment shown in FIG. 18, the steps for supplying the pressure to the piston 22 are discussed. This exemplary embodiment shows a method for calculating an instant when a pressure increase is to be applied to a shear ram in a blowout preventer in which a closing pressure applied to the shear ram is closing the shear ram but is not enough to shear a pipe crossing the blowout preventer. The method includes a step 1800 of determining a current position of the shear ram while the shear ram is closing but is not in contact with the pipe, a step 1802 of comparing the determined current position with a shear reference position, wherein the shear reference position is the position of the shear ram when starting to shear the pipe and the shear reference position is either calculated prior to shearing the pipe or determined based on a pressure indicator that determines an increased pressure produced by the shear ram encountering the pipe, and a step 1804 of calculating the instant as the time when the determined current position is substantially equal to the shear reference position such that a supplemental closing pressure is applied at the instant to the closing pressure to shear the pipe.

Figure 19:
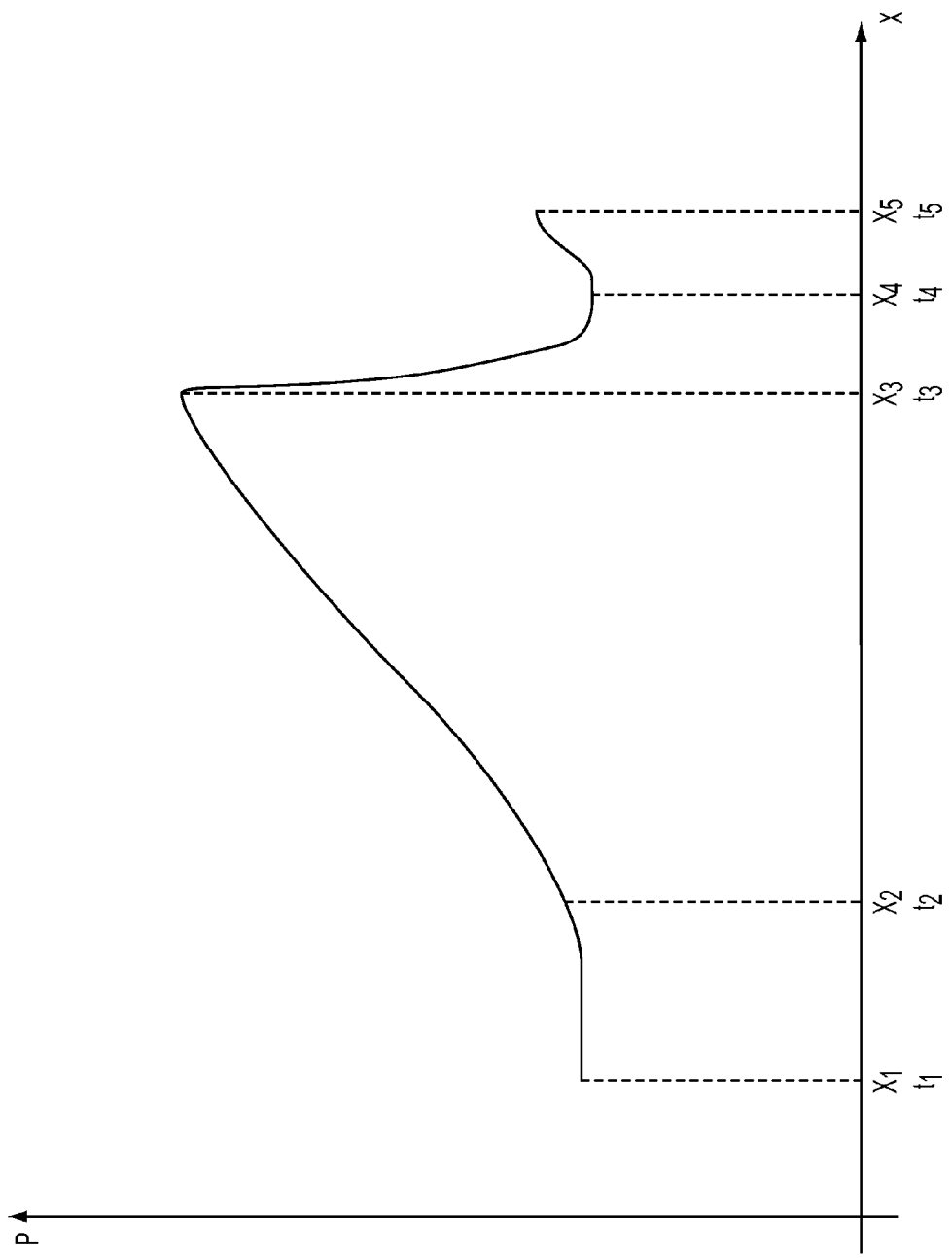
FIG. 19 is a graph showing a profile of a pressure applied to the ram block versus a position of the ram block while shearing a pipe according to an exemplary embodiment.

Alternatively or in addition to the exemplary embodiments discussed above, the supply of additional closing pressure may be correlated with a graph as shown in FIG. 19, in which the closing pressure is displayed versus a position of a ram block. More specifically, the closing pressure applied to the ram block 20 may be measured with a pressure sensor. The position of the ram block may also be measured as already discussed above. The pressure and position data may be transmitted to the computing system, which is able to plot the pressure versus ram block position. For normal operating conditions, i.e., a ram block that closes and shears a tool existing in the well 18, the graph of the pressure P versus position X of the ram block is illustrated in FIG. 19. The closing pressure is provided to the ram block at time t1, or when the distance X1 from the ram block to the a central axis of the vertical bore of the BOP is maximum. As the ram block moves towards the tool in the well, the pressure is substantially constant. At time t2, which corresponds to a position x2) the ram block contacts the tool, which provides a certain resistance to the movement of the ram block. In order to keep the ram block moving, either the closing pressure is increased or a supplementary closing pressure is provided. The net pressure applied to the ram block is shown increasing from t2 to t3. This profile may vary from BOP to BOP, depending on the characteristics of the BOP and also depending from the characteristics of the tool, e.g., resistance, diameter, composition, etc.

At t3 the tool is considered to be severed in two parts. At this time, the pressure necessary for moving forward the ram blocks decreases as shown in FIG. 19, between t3 and t4. The ram block still needs to move forward as the gap between the ram blocks is not zero when the tool is sheared. At time t4 the ram block still moves towards the central axis of the vertical bore and the ram block touches the pairing ram blocks. Between t4 and t5 the ram blocks seal the well and their frontal faces come in contact, pressing the elastomers for achieving the seal. For this reason, the pressure increases again towards t5 as one ram block presses against the other ram block.

As discussed above with regard to FIG. 15, the pressure profile shown in FIG. 19 may be generated with a single accumulator or two accumulators working together. The discussions with regard to FIGS. 15 and 16 are valid for this exemplary embodiment and are not repeated herein. A difference between this exemplary embodiment and those discussing FIGS. 15 and 16 is that a time t does not have to be calculated for generating the graph of FIG. 19. In this exemplary embodiment, both the pressure and the distance X are measured by the already discussed sensors and this data is used by the computing system to generate FIG. 19. The data of FIG. 19 may be stored by the computing system and used by the operator for identifying the status of the ram blocks even if one of the sensor and position sensors fail. Further, positions x2 and x3 may be used by the computing system to automatically turn on and off an additional accumulator for providing the necessary shearing closing pressure.

In one application, the graph shown in FIG. 19 may be determined for a specific BOP while the BOP is in the manufacturing facility. Once the BOP is installed on top of the well, only the position X of the ram block may be measured to correctly turn on and off the additional closing pressure. In another applications, various pressure profiles may be determined for a given BOP, e.g., for shearing a pipe, shearing tools other than a pipe, just sealing without shearing and all these profiles may be stored in the computational device. While in operation, the operator determines what tools are present inside the well, inputs this determination to the computing system, and the computing system automatically determines the appropriate positions X2 and X3 for turning on and off the additional closing pressure.

Various user interfaces for representing the positions of the ram blocks and/or the elastomer are now discussed with regard to FIGS. 20-26. These user interfaces may also be applied for illustrating a gap between the ram blocks, a state of the elastomer, a state of the backlash, and other parameters as already discussed above.

Figure 20:
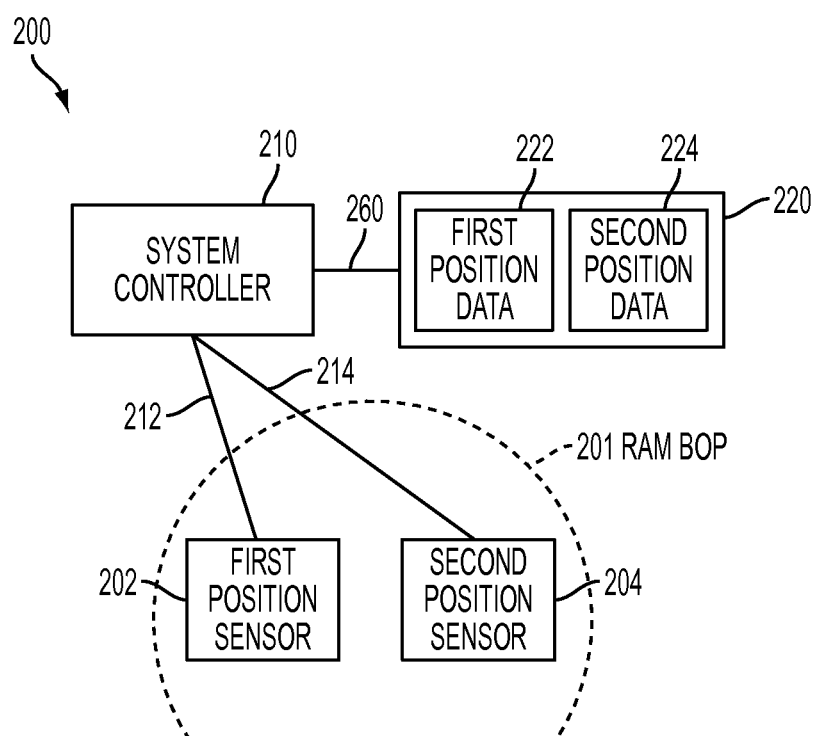
FIG. 20 shows a display apparatus in accordance with an embodiment of the present disclosure.

FIG. 20 shows a system 200 for displaying position data from the BOP 16 that includes a first position sensor 202, a second position sensor 204, a system controller 210, and a display unit 220. In select embodiments, first position sensor 202 may be disposed on a fore side ram of the BOP 16, and second position sensor 204 may be disposed on a horizontally opposed aft side ram of BOP 16. First and second position sensors 202, 204 sense the relative position of the fore side ram and aft side ram of BOP 16, respectively. First and second position sensors 202, 204 may be, as discussed above, linear variable displacement transducers ("LVDTs"), also known as linear variable differential transformers, or any other suitable position sensor known to one of ordinary skill in the art. First and second position sensors 202, 204 may produce a signal, such as a voltage or pressure, which indicates how far open or closed fore and aft side rams of BOP 16 are, respectively.

System controller 210 may be in communication with first position sensor 202 over a first connection 212 and with second position sensor 204 over a second connection 214. Those skilled in the art will appreciate that first and second connections 212, 214 may be multiplexed over a single MUX hose or electrical connection. Alternatively, first and second connections 212, 214 may also be individual MUX hoses, electrical connections, or any other connection known to one of ordinary skill in the art. System controller 210 may also be in communication with display unit 220 over a third connection 260. Third connection 260 may be a direct electrical connection, a connection a communications network, such as a local area network ("LAN") or the internet, or any other connection known to one of ordinary skill in the art.

In a very simplified operation, system controller 210 receives first and second position data 222, 224 from first and second position sensors 202, 204 over first and second connections 212, 214. System controller 210 then transmits first and second position data 222, 224 over third connection 260 to display unit 220. Display unit 220 then displays first and second position data 222, 224 on the screen as first position data 222 and second position data 224. Display unit 220 may be a liquid crystal display ("LCD"), cathode ray tube ("CRT") display, a projection display, or any other display known to one of ordinary skill in the art. Furthermore, first and second position data 222, 224 may be displayed in a variety of different ways in order to clearly convey the information to a well control operator, as discussed with respect to further embodiments below. Once displayed, the position data may be analyzed by a well control operator controlling the ram blowout preventer in order to determine the positions of the rams within the ram blowout preventer, and may also be used to determine whether the rams have experienced wear over time.

Figure 21:
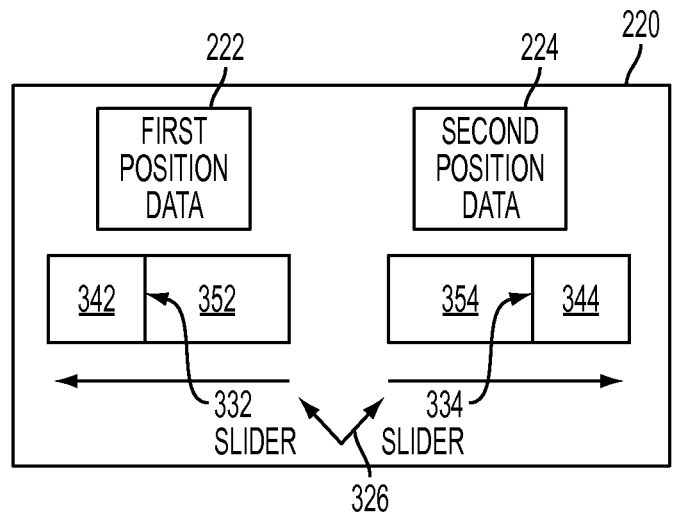
FIG. 21 shows a display unit in accordance with an embodiment of the present disclosure.

FIG. 21 shows an embodiment of display unit 220 displaying first position data 222 and second position data 224 in the form of "slider," or "progress," bars. A relative position of a first slider 332 within the display area of first position data 222 indicates how far open, or closed, the fore side BOP 16 is positioned. Similarly, a relative position of a second slider 334 within the display area of second position data 224 may indicate how far open, or closed, the aft side BOP 16 is positioned. Arrows 326 indicate the opening direction for each of the fore and aft side rams of BOP 16. Thus, if first slider 332 is moving in the direction of the left side arrow 326, the fore side ram of BOP 16 is opening, and if second slider 334 is moving in the direction of the right side arrow 326, the aft side ram of BOP 16 is opening. Similarly, if first slider 332 is moving in the direction opposite of the left side arrow 326, the fore side BOP 16 is closing, and if second slider 334 is moving in the direction opposite of the right side arrow 326, the aft side BOP 16 is closing.

Sliders 332, 334 divide each of the display areas of first position data 222 and second position data 224 into two areas. The relative sizes of these areas indicate how far open or closed each of the rams of BOP 16 is. In order to clearly distinguish the two areas for a well control operator observing the display, the two areas may be colored with two different background colors. In this embodiment, first colors 342, 344 indicate the percentage closed of each of the fore and aft side rams of BOP 16, and second colors 352, 354 indicate the percentage open of each of the fore and aft side rams of BOP 16.

In this particular example, first colors 342, 344 each take up approximately 25% of the total area of the displays of first and second position data 222, 224, and, therefore, each of the fore and aft side rams of BOP 16 may be approximately 25% closed. Second colors 352, 354 each take up approximately 75% of the total area of the displays of first and second position data 222, 224, and, therefore, each of the fore and aft side rams of BOP 16 may be approximately 75% open. In select embodiments, the color green is used to indicate percentage open, and the color red is used to indicate the percentage closed for clarity, but first and second colors 342, 344, 352, and 354 are not limited to the colors red and green.

Figure 22:
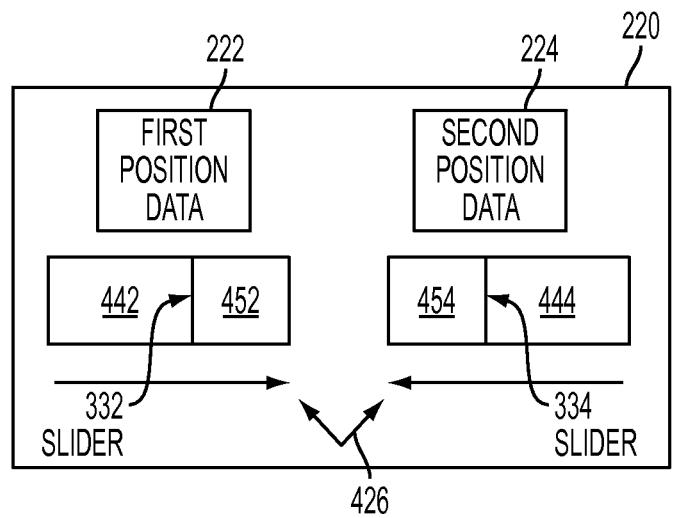
FIG. 22 shows a display unit in accordance with an embodiment of the present disclosure.

FIG. 22 shows an alternate embodiment of display unit 220 displaying first position data 222 and second position data 224 in the form of slider, or progress, bars. Specifically, in this embodiment, arrows 426 point in the reverse directions of analogous arrows 326 shown in FIG. 21. Sliders 332, 334 divide each of the display areas of first position data 222 and second position data 224 into two areas. However, in this embodiment, first colors 442, 444 indicate the percentage open of each of the fore and aft side rams of BOP 16, and second colors 452, 454 indicate the percentage closed of each of the fore and aft side rams of BOP 16. Thus, reversing the arrow on a slider bar simply reverses whether each color shown indicates percentage open or percentage closed.

While FIGS. 21 and 22 each show horizontal slider bars, one of ordinary skill in the art would appreciate that the slider bars may also be displayed vertically. Further, the edges of the display areas of first and second position data 222, 224 that are parallel to sliders 332, 334 may be marked to indicate the open direction instead of displaying arrows 326 or arrows 426 to indicate the open direction. For example, one edge may be marked "0%" and one edge may be marked "100%" in order to indicate the percentage open or closed a ram is. Alternatively, one edge may be marked with a maximum distance, such as "12 inches," while the other edge may be marked with a minimum distance, such as "0 inches" in order to indicate the distance open or closed of a ram.

Figure 23:
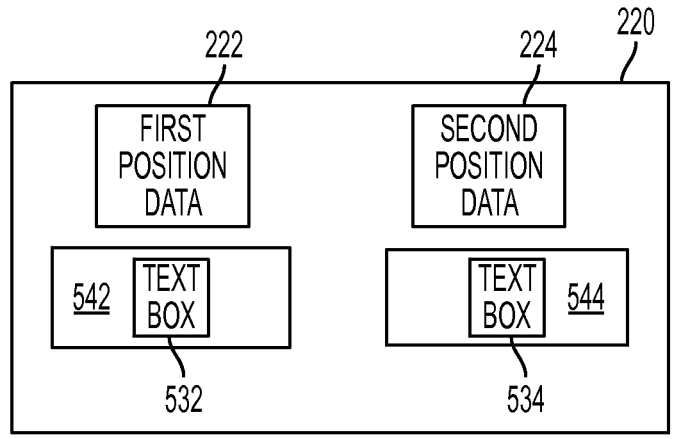
FIG. 23 shows a display unit in accordance with an embodiment of the present disclosure.

FIG. 23 shows an embodiment of display unit 220 displaying first position data 222 and second position data 224 in the form of text boxes 532, 534. Specifically, text boxes 532, 534 may contain text indicating the percentage, or distance, each of the fore and aft side rams of BOP 16, respectfully, is positioned. Examples of the content of text boxes 532, 534 include, for example, "52%," "84%," "0.2 inches," and "12 inches." Text box 532 may be colored with color 542 and text box 534 may be colored with color 544. In this embodiment, colors 542, 544 indicate whether the text in text boxes 534 is indicating the open or closed directions. For example, if text box 532 includes text "54%" and color 542 is green, which preferably indicates open or opening, a well control operator may discern that the fore side BOP 16 is 54% open and currently opening. Alternatively, if text box 534 includes text "54%" and color 544 is red, which preferably indicates closed or closing, a well control operator may discern that the aft side BOP 16 is 54% closed and currently closing. In alternate embodiments, the text within text boxes 532, 534 may be colored 542, 544 instead of the background.

Figure 24:
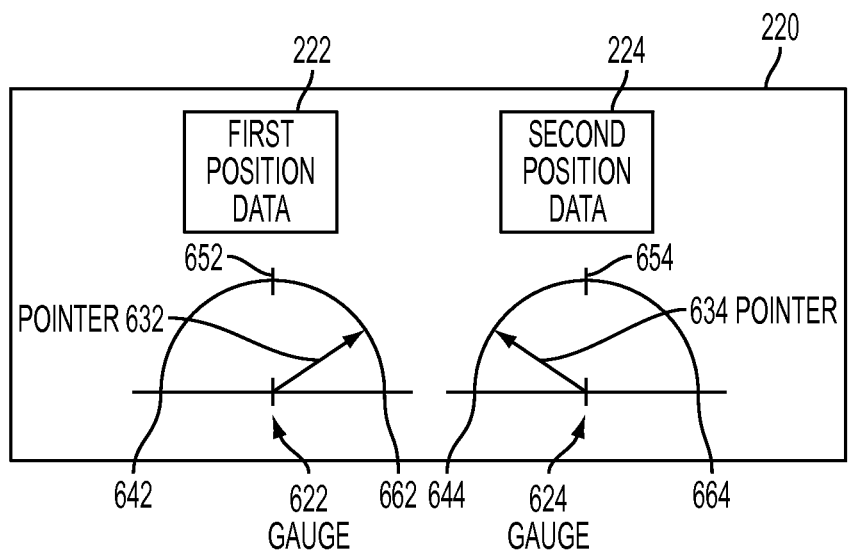
FIG. 24 shows a display unit in accordance with an embodiment of the present disclosure.

FIG. 24 shows an embodiment of display unit 220 displaying first position data 222 and second position data 224 in the form of first and second gauges 622, 624. First gauge includes pointer 632, and tick marks 642, 652, and 662. Tick marks 642, 652, and 662 indicate to a well control operator how far open or closed the fore side ram of ram blowout preventer is based on the relative position of pointer 632. Tick marks 642, 652, and 662 may indicate percentages open or closed, such as 0%, 50%, and 100%, respectively. Alternatively, tick marks 642, 652, and 662 may indicate distances open or closed, such as 0 inches, 6 inches, and 12 inches, respectively. Similarly, second gauge includes pointer 634, and tick marks 644, 654, and 664. Tick marks 644, 654, and 664 indicate to a well control operator how far open or closed the aft side BOP 16 is based on the relative position of pointer 634.

Figure 25:
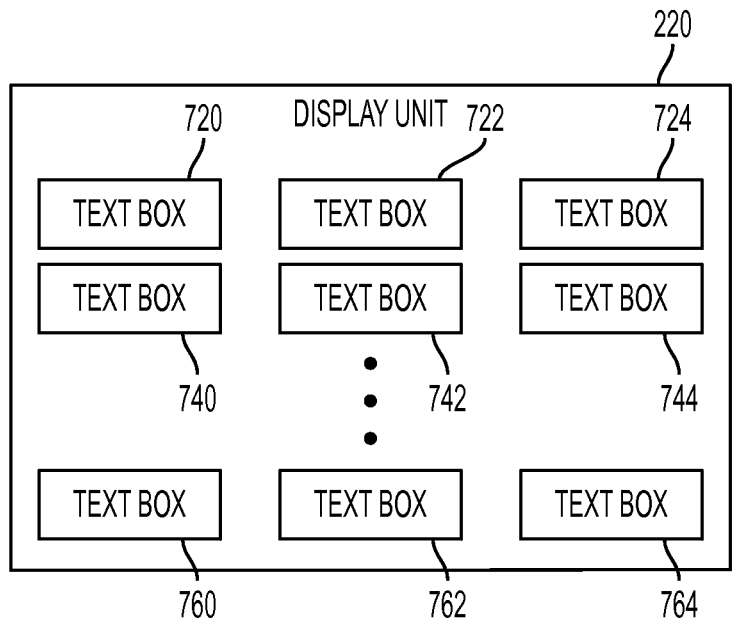
FIG. 25 shows a display unit in accordance with an embodiment of the present disclosure.

FIG. 25 shows an embodiment of display unit 220 displaying first position data and second position data in the form of a series of text boxes in order to show a time history of first position data and second position data. The first column, including text boxes 720, 740, and 760, indicate the times at which data recordings were taken. The second column, including text boxes 722, 742, and 762, may indicate the first position data read at the time indicated by corresponding text boxes 720, 740, and 760, respectively. Similarly, the third column, including text boxes 724, 744, and 764, may indicate the second position data read at the time indicated by corresponding text boxes 720, 740, and 760, respectively. For example, text boxes 720, 722, and 724 may read "Sep. 12, 2008, 14:44 CST," "54% Open," and "55% Open," respectively. Alternatively, background colors may be used to indicate opening or closing, as discussed with respect to other embodiments above. In alternate embodiments, the time history of first position data and second position data may be saved in a similar format in a spreadsheet file or database instead of series of text boxes.

Figure 26:
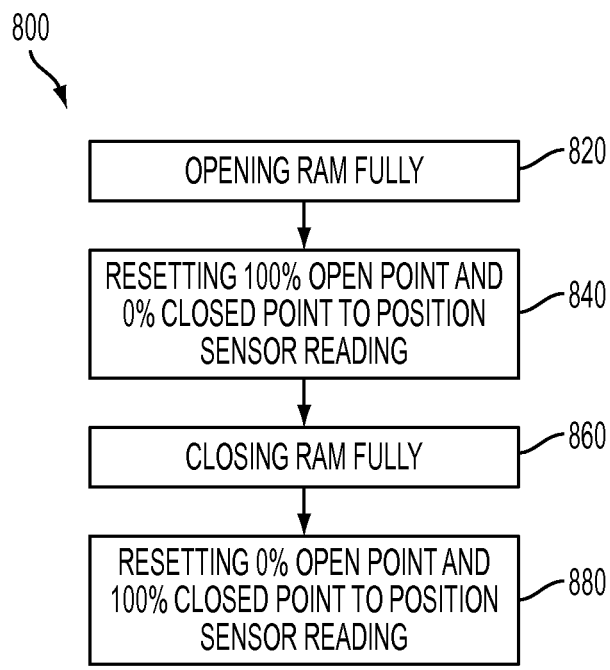
FIG. 26 shows a flowchart for a method in accordance with an embodiment of the present disclosure.

FIG. 26 shows a flow chart 800 outlining the steps of a method of calibrating a position sensor in order to accurately display position data from a ram of a ram blowout preventer. First, in step 820, a ram of the BOP 16 is fully opened. Next, in step 840, an open reading is taken from a position sensor corresponding the fully open BOP 16, and the 100% open and 0% closed points used are reset to the open reading. In step 860, the BOP 16 is fully closed. Finally, in step 880, a closed reading is taken from the position sensor corresponding the fully closed ram of ram blowout preventer, and the 0% open and 100% closed points used are reset to the closed reading. More specifically, based on the 100% open and 100% closed readings, indicators are set to correspond to when the ram is fully opened and fully closed. Subsequent intermittent positions are then adjusted relative to the 100% open and the 100% closed positions.

For example, consider an LVDT position sensor wherein, ideally, a 0 volt reading indicates that the ram on which the LVDT position sensor is disposed is fully open, and, ideally, a 10 volt reading indicates that the ram on which the LVDT position sensor is disposed is fully closed. However, during use, these readings may be modified such that the readings need to be calibrated to accurately reflect the position of the rams. An example of calibrating the LVDT readings is now provided. In step 820, the ram on which the LVDT position sensor is disposed is opened fully. In step 840, the open reading of the LVDT position sensor indicates 0.4 volts, and the 100% open and 0% closed points are reset to 0.4 volts. In step 860, the ram on which the LVDT position sensor is disposed is closed fully. In step 880, the open reading of the LVDT position sensor indicates 9.4 volts, and the 0% open and 100% closed points are reset to 9.4 volts. The process may be repeated for both the fore and aft rams in a ram blowout preventer, as needed.

Advantageously, calibrating a position sensor in order to accurately display position data from a ram of ram blowout preventer, as discussed above, also allows a well control operator to detect wear of one or more components of a ram blowout preventer. Generally, a ram includes rubber products that periodically needs to be replaced. By calibrating the position sensors disposed on the rams at the time a rubber product is replaced, anomalous future readings may indicate wear on the rubber product, indicating that it needs to be replaced. Assuming that the above calibration example took place immediately after a new rubber product was installed on the ram on which the LVDT position sensor is disposed, in one application, the minimum position value of the LVDT position sensor is expected to be 0.4 volts, and the maximum position value of the LVDT position sensor is expected to be 9.4 volts. In alternate embodiments, the minimum and maximum position values may correspond to the fully closed and fully open sensor readings, respectively. Those skilled in the art will appreciate that while the above example focuses on a rubber product, the calibration may take place after a component of another type of material is installed on a ram (for example, position sensor), and as such, embodiments disclosed herein are not limited to calibration after the installation of rubber products.

The minimum position value may be displayed to a well control operator, for example, as 0.4 volts, 0% closed, or 0 inches. If the well control operator sees that the displayed position value is less than 0.4 volts, 0% closed, or 0 inches, it may be deduced that wear has occurred and the rubber product on the ram on which the LVDT position sensor is disposed needs to be replaced. Further, the maximum position value may be displayed to a well control operator, for example, as 9.4 volts, 100% closed, or 12 inches. If the well control operator sees that the displayed position value is greater than 9.4 volts, 100% closed, or 12 inches, it may be deduced that wear has occurred and the rubber product on the ram the LVDT position sensor is disposed on needs to be replaced.

Embodiments of a system for displaying position data from a ram blowout preventer and the methods of calibrating a position sensor and detecting wear disclosed herein may exhibit the following advantages over systems and methods that may be used for similar purposes. Embodiments disclosed herein may provide more accurate position data with respect to the rams in a ram blowout preventer. Embodiments disclosed herein may display position data in a way that is clearer to a well control operator analyzing the position data. Embodiments disclosed herein may allow position data to be analyzed by a well control operator located offsite. Finally, embodiments disclosed herein may provide a more accurate method of detecting wear on a ram in a ram blowout preventer.

For purposes of illustration and not of limitation, an example of a representative computing system 2700 capable of carrying out operations in accordance with the exemplary embodiments is illustrated in FIG. 27. It should be recognized, however, that the principles of the present exemplary embodiments are equally applicable to standard computing systems.

The exemplary computing system 2700 may include a processing/control unit 2702, such as a microprocessor, reduced instruction set computer (RISC), or other central processing module. The processing unit 2702, which may be or include the CPU 92, need not be a single device, and may include one or more processors. For example, the processing unit 2702 may include a master processor and associated slave processors coupled to communicate with the master processor.

The processing unit 2702 may control the basic functions of the system as dictated by programs available in the storage/memory 2704. Thus, the processing unit 2702 may execute the functions described in FIGS. 4-27. More particularly, the storage/memory 2704 may include an operating system and program modules for carrying out functions and applications on the computing system. For example, the program storage may include one or more of read-only memory (ROM), flash ROM, programmable and/or erasable ROM, random access memory (RAM), subscriber interface module (SIM), wireless interface module (WIM), smart card, or other removable memory device, etc. The program modules and associated features may also be transmitted to the computing system 2700 via data signals, such as being downloaded electronically via a network.

One of the programs that may be stored in the storage/memory 2704 is a specific program 2706. As previously described, the specific program 2706 may interact with the position sensing mechanism to determine/calculate the position of the piston 22 relative to the body of the BOP 16. The program 2706 and associated features may be implemented in software and/or firmware operable by way of the processor 2702. The program storage/memory 2704 may also be used to store data 2708, such as the threshold values discussed in the exemplary embodiments, or other data associated with the present exemplary embodiments, for example, data associated with the graph shown in FIG. 12. In one exemplary embodiment, the programs 2706 and data 2708 are stored in non-volatile electrically-erasable, programmable ROM (EEPROM), flash ROM, etc. so that the information is not lost upon power down of the computing system 2700.

The processor 2702 may also be coupled to user interface 2710 elements associated with a user terminal. The user interface 2710 of the user terminal may include, for example, a display 2712 such as a liquid crystal display, a keypad 2714, speaker 2716, and a microphone 2718. These and other user interface components are coupled to the processor 2702 as is known in the art. The keypad 2714 may include alpha-numeric keys for performing a variety of functions, including dialing numbers and executing operations assigned to one or more keys. Alternatively, other user interface mechanisms may be employed, such as voice commands, switches, touch pad/screen, graphical user interface using a pointing device, trackball, joystick, or any other user interface mechanism.

The computing system 2700 may also include a digital signal processor (DSP) 2720. The DSP 2720 may perform a variety of functions, including analog-to-digital (A/D) conversion, digital-to-analog (D/A) conversion, speech coding/decoding, encryption/decryption, error detection and correction, bit stream translation, filtering, etc. The transceiver 2722, generally coupled to an antenna 2724, may transmit and receive radio signals associated with a wireless device.

The computing system 2700 of FIG. 27 is provided as a representative example of a computing environment in which the principles of the present exemplary embodiments may be applied. From the description provided herein, those skilled in the art will appreciate that the present invention is equally applicable in a variety of other currently known and future computing environments. For example, the specific application 2706 and associated features, and data 2708, may be stored in a variety of manners, may be operable on a variety of processing devices, and may be operable in mobile devices having additional, fewer, or different supporting circuitry and user interface mechanisms.

The disclosed exemplary embodiments provide a system, a method and a computer program product for determining a position of a piston and using this determined position in various applications related to the BOP 16. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a system, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other example are intended to be within the scope of the claims if they have structural elements that do not differ from the literal language of the claims, or if they include equivalent structural elements with insubstantial differences from the literal languages of the claims.

What is claimed is:

1. A method for sensing a backlash of a ram block of a blowout preventer, in which a closing pressure is applied to a piston connected to the ram block to close the ram block for sealing a vertical bore, the method comprising:

determining a current position of the piston after a ram locking mechanism locks the closed ram block and the closing, pressure is released;

calculating a difference between the current position of the piston and a reference position of the piston, wherein the reference position is determined when the ram block is closed, the closing pressure applied to the ram block is released, and components of the ram locking mechanism are not worn:
comparing the difference with a predetermined value; and
displaying, based on a result of the comparing step, a first indication related to whether backlash is present.

2. The method of claim 1, further comprising: applying a supplemental closing pressure to overcome the backlash.

3. The method of claim 1, wherein the displaying step comprises: displaying the indication when the calculated difference is larger than a predetermined threshold.

4. The method of claim 3, wherein the predetermined threshold is between about 0.2 cm and about 0.5 cm.

5. The method of claim 1, wherein the displaying step further comprises: displaying on a display (i) a curve indicative of the backlash of the ram block versus a number of closings of the ram block and (ii) a backlash threshold.

6. The method of claim 1, further comprising: displaying a second indication related to whether components of the ram locking mechanism are worn.

7. A computer readable medium for storing computer executable instructions, wherein the instructions, when executed by a processor, cause the processor to sense a backlash of a ram block of a blowout preventer, in which a closing pressure is applied to a piston connected to the ram block to close the ram block for sealing a vertical bore and a locking pressure is applied to a ram locking mechanism for locking the piston, the instructions comprising:
determining a current position of the piston after the ram locking mechanism locks the closed ram block and the dosing pressure is released;
calculating a difference between the current position of the piston and a reference position of the piston, wherein the reference, position is determined when the ram block is closed, the closing pressure applied to the ram block is released, and components of the ram locking mechanism are not worm
comparing the difference with a predetermined value; and
displaying, based on a result of the comparing step, a first indication related to whether a backlash is present.

8. The medium of claim 7, further comprising: applying a supplemental closing pressure to overcome the backlash.

9. The medium of claim 7, wherein the displaying step comprises: displaying the indication when the calculated difference is larger than a predetermined threshold.

10. The medium of claim 9, wherein the predetermined threshold is between about 0.2 cm and about 0.5 cm.

11. The medium of claim 7, wherein the displaying step further comprises: displaying on a display (i) a curve indicative of the backlash of the ram block versus a number of closings of the ram block and (ii) a backlash threshold.

12. The medium of claim 7, further comprising: displaying a second indication related to whether components of the ram locking mechanism are worn.

13. A method for recording positions of ram blocks of a blowout preventer, in which a closing pressure is applied to pistons connected to the ram blocks to close the ram blocks fur sealing a vertical bore, the method comprising:
determining current positions of the pistons while the ram blocks are closed and white the closing pressure is maintained;
calculating first and second differences between the current positions of the pistons and corresponding reference positions of the pistons, wherein the reference positions are determined when the ram blocks are closed, the closing pressure applied to the ram block is maintained, and rubber components of the ram blocks are not worn;
adding together the first and second differences to determine a size of a gap between the ram blocks;
comparing the size of the gap with a predetermined gap; and
displaying, based on a result of the comparing step, an indication related to whether the rubber components of the ram blocks are worn.

14. The method of claim 13, wherein the displaying step comprises; displaying a numerical indication related to a thickness of the rubber components.

15. The method of claim 14, wherein the displaying step comprises: displaying the indication when the calculated size of the gap is smaller than is predetermined threshold.

16. The method of claim 13, wherein the size of the gap is between about 0.2 cm and about 0.5 cm.

17. The method of claim 13, wherein the displaying step further comprises: displaying on a display (i) a curve indicative of the thickness of the components of the rubber versus a number of closings of the ram block and (ii) a rubber threshold.

18. A computer readable medium for storing computer executable instructions, wherein the instructions, when executed by a processor, cause the processor recording positions of ram blocks of a blowout preventer, in which a closing pressure is applied to pistons connected to the ram blocks to close the ram blocks for sealing a vertical bore, the instructions comprising:
determining current positions of the pistons while the ram blocks are closed and while, the closing pressure is maintained;
calculating first and second differences between the current positions of the pistons and corresponding reference positions of the pistons, wherein the reference positions are determined when the ram blocks are closed, the closing pressure applied to the ram block is maintained, and rubber components of the ram blocks are not worn;
adding together the first and second differences to determine a size of a gap between the ram blocks;
comparing the size of the gap with a predetermined gap; and displaying, based on a result of the comparing step, an indication related to whether the rubber components of the ram blocks are worn.

19. The medium of claim 18, wherein the displaying step further comprises: displaying a numerical indication related to a thickness of the rubber components.

20. The medium of claim 19, wherein the displaying step comprises: displaying the indication when the calculated size of the gap is smaller than a predetermined threshold.

21. The medium of claim 18, wherein the size of the gap is between about 0.2 cm and about 0.5 cm.

22. The medium of claim 18, wherein the displaying step further comprises: displaying on a display (i) a curve indicative of the thickness of the components of the rubber versus a number of closings of the ram block and (ii) a rubber threshold.

23. A method for calculating a shear instant when a pressure, increase is to be applied to a shear ram of a blowout preventer in which a closing pressure applied to the shear ram is closing the shear ram but is not enough to shear a pipe crossing the blowout preventer, the method comprising:
determining a current position of the shear ram while the shear ram is closing but prior to contacting the pipe:
comparing, the determined current position with a shear reference position, wherein the shear reference position is the position of the shear ram when contacting the pipe and the shear reference position is either calculated prior to shearing the pipe or determined based on a pressure indicator that determines an increased pressure produced by the shear ram encountering the pipe; and calculating the shear instant as a time when the determined current position is substantially equal to the shear reference position such that a supplemental closing pressure is applied at the shear time to the closing pressure to shear the pipe.

24. The method of claim 23, further comprising: applying the closing pressure from a first accumulator such that the closing pressure is not enough for the she ram to shear the pipe.

25. The method of claim 24, further comprising: applying the supplemental closing pressure from as second accumulator, different from the first accumulator, such that the closing pressure together with the supplemental closing pressure is enough for shearing the pipe.

26. A computer readable medium for storing computer executable instructions, wherein the instructions, when executed by a processor, cause the processor to determine a shear instant when a pressure increase is to be applied to a shear ram in a blowout preventer in which a closing pressure applied to the shear ram is closing the shear ram but is not enough to shear a pipe crossing the blowout preventer, the instructions comprising:

determining a current position of the shear ram while the shear ram is closing but prior to contacting the pipe;

comparing the determined current position with a shear reference position, wherein the shear reference position is the position of the shear ram when contacting the pipe and the shear reference position is either calculated prior to shearing the pipe or determined based on a pressure indicator that determines an increased pressure produced by the shear ram encountering the pipe; and calculating the shear instant as a time when the determined current position is substantially equal to the shear reference position such that a supplemental closing pressure is applied at the shear instant to the closing pressure to shear the pipe.

27. The medium of claim 26, further comprising: applying the closing pressure from a first accumulator such that the closing pressure is not enough for the shear ram to shear the pipe.

28. The medium of claim 27, further comprising: applying the supplemental closing pressure from a second accumulator, different from the first accumulator, such that the closing pressure together with the supplemental closing pressure is enough for closing the shear ram to shear the pipe.

29. A method to determine wear in a blowout preventer, the method comprising:

disposing a position sensor on a ram of the blowout preventer;

communicating with a system controller operatively connected to the position sensor;

communicating with a display unit operatively connected to the system controller;

calibrating the position sensor to determine a maximum position value and a minimum position value of the position sensor, wherein calibrating the position sensor comprises: fully opening the ram of the blowout preventer; setting the minimum position value to the position data from the position sensor with the ram fully open; fully closing the ram of the blowout preventer; and setting the maximum position value to the position data from the position sensor with the ram fully closed;

displaying position data obtained from the position sensor on the display unit; and determining whether exists in the blowout preventer, wherein exists in the blowout preventer when one selected from a group consisting of the displayed position data is greater than the maximum position and the displayed position data is less than the minimum position value occurs.

* * * * *